(12) United States Patent
Padula

(10) Patent No.: US 11,072,211 B2
(45) Date of Patent: Jul. 27, 2021

(54) LOAD BASED TIRE PRESSURE REGULATION SYSTEM AND METHODS

(71) Applicant: Santo A. Padula, Medina, OH (US)

(72) Inventor: Santo A. Padula, Medina, OH (US)

(*) Notice: Subject to any disclaimer, the term of this patent is extended or adjusted under 35 U.S.C. 154(b) by 129 days.

(21) Appl. No.: 16/157,627

(22) Filed: Oct. 11, 2018

(65) Prior Publication Data

US 2019/0105952 A1 Apr. 11, 2019

Related U.S. Application Data

(60) Provisional application No. 62/570,816, filed on Oct. 11, 2017.

(51) Int. Cl.
*B60C 23/00* (2006.01)
*B60G 17/019* (2006.01)

(52) U.S. Cl.
CPC .......... *B60C 23/002* (2013.01); *B60C 23/003* (2013.01); *B60C 23/009* (2013.01); *B60G 17/019* (2013.01); *B60G 2200/31* (2013.01); *B60G 2202/152* (2013.01); *B60G 2300/026* (2013.01); *B60G 2300/042* (2013.01); *B60G 2400/51222* (2013.01); *B60G 2400/64* (2013.01); *B60G 2800/984* (2013.01)

(58) Field of Classification Search
CPC ... B60C 23/002; B60C 23/003; B60C 23/009; B60G 17/019; B60G 2800/984; B60G 2400/51222; B60G 2300/042; B60G 2400/64; B60G 2202/152; B60G 2300/026; B60G 2200/31
See application file for complete search history.

(56) References Cited

U.S. PATENT DOCUMENTS

2018/0312018 A1* 11/2018 Wilson ................ B60C 23/0408
2019/0118586 A1* 4/2019 Wilson .................... B60S 5/046
2020/0096128 A1* 3/2020 Cervantez ............. B60C 23/003

* cited by examiner

*Primary Examiner* — Paul N Dickson
*Assistant Examiner* — Joselynn Y Sliteris
(74) *Attorney, Agent, or Firm* — Renner Kenner Greive Bobak Taylor & Weber

(57) ABSTRACT

A load based tire pressure regulation system for trucks or trailers employing an air spring maintained at a variable pressure $P_{AS}$ depending upon the load on the truck or trailer, includes an air pilot pressure regulator receiving air at pressure $P_{AS}$ and air at the pressure of at least one tire of a truck or trailer, and configured to feed air to and bleed air from the at least one tire of the truck or trailer as a function of the load on the truck or trailer. The pressure regulator is configured to feed air to and bleed air from the at least one tire of the truck or trailer based upon the pressure of the air spring $P_{AS}$ as a function of the load on the air spring ($F_{AS}$), and further upon the recommended pressure $P_T$ of the at least one tire as a function of the load on the tire ($F_T$).

14 Claims, 17 Drawing Sheets

Air Spring Load Characteristic Data

| Spring Height | Veyence 1R14-127 | | | | Firestone 1T17CL-5 | | Firestone 1T19L-5 | | | |
|---|---|---|---|---|---|---|---|---|---|---|
| | 10.7 In | | 13.2 In | | 23.0 In | | 7.4 - 13.0 In | | 7.0 In | | 10.4 In | |
| | Force | K Factor | Force | K Factor | Force | K Factor | Force | K Factor | Force | K Factor | Force | K Factor |
| | | Lbs./PSI | | Lbs./PSI | | Lbs./PSI | | Lbs./PSI | | Lbs./PSI | | Lbs./PSI |
| Air spring Pressure | | | | | | | | | | | | |
| 20 | | | | | | | 1750 | 87.50 | 2100 | 105.00 | 1975 | 98.75 |
| 40 | 4700 | 117.50 | 3800 | 95.00 | 3600 | 90.00 | 3500 | 87.50 | 4100 | 102.50 | 4000 | 100.00 |
| 60 | 7000 | 116.67 | 5750 | 95.83 | 5500 | 91.67 | 5400 | 90.00 | 6150 | 102.50 | 6075 | 101.25 |
| 80 | 9300 | 116.25 | 7600 | 95.00 | 7400 | 92.50 | 7350 | 91.88 | 8200 | 102.50 | 8175 | 102.19 |
| 100 | 11500 | 115.00 | 9600 | 96.00 | 9400 | 94.00 | 9250 | 92.50 | 10100 | 101.00 | 10075 | 100.75 |
| 120 | | | | | | | 11200 | 93.33 | 12400 | 103.33 | 10350 | 86.25 |
| Average K Factor = | 116.35 | | 95.46 | | 92.04 | | 91.04 | | 102.37 | | 98.09 | |

FIG. 4A

LOAD BASED TIRE PRESSURE REGULATION SYSTEM AND METHODS

CROSS-REFERENCE TO RELATED APPLICATIONS

The present application claims the benefit of U.S. Provisional Patent Application Ser. No. 62/570,816, filed Oct. 11, 2017, and incorporated herein in its entirety.

FIELD OF THE INVENTION

The present invention generally relates to tire inflation systems. More particularly, the present invention relates to systems and methods for regulating the pressure within a tire based upon the load carried. In some embodiments, the present invention relates to systems and methods for regulating the pressure within at least one tire of a tractor and/or trailer, the pressure being regulated according to the load on the truck or trailer at any given time.

BACKGROUND OF THE INVENTION

A tire installed on a tractor or trailer performs optimally when inflated to a pressure appropriate for the load that it is carrying. A tire inflated to a recommended inflation pressure that corresponds to a given load on the tire will perform satisfactorily when carrying that given load, but will be overinflated when that load is reduced or when the trailer is empty, and will be underinflated when that load is increased. A tire inflated to a "target inflation pressure" that is recommended for a maximum load on the tire will perform satisfactorily when carry that maximum load, but will be overinflated as the load is reduced or when the trailer is empty. Present tire inflation systems perform the function of maintaining a target inflation pressure, and a few can reduce an overinflated tire down to the target inflation pressure. Very few economically viable systems have the means of adjusting the tire pressure lower than the target inflation pressure. There is no known system that can control the tire pressure by increasing and decreasing tire pressure based on the load that is on the truck or trailer at any given time. Thus there is a need in the art for apparatus and methods for controlling tire pressure based upon the load that is on the truck or trailer at any given time.

SUMMARY OF THE INVENTION

In a first embodiment, the present invention provides a load based tire pressure regulation system for trucks or trailers employing an air spring maintained at a variable pressure $P_{AS}$ depending upon the load on the truck or trailer, comprising: a pressure regulator assembly receiving air at pressure $P_{AS}$ and air at the pressure of at least one tire of a truck or trailer, and configured to feed air to and bleed air from the at least one tire of the truck or trailer as a function of the load on the truck or trailer.

In a second embodiment, the present invention provides a system as in any embodiment above, wherein the pressure regulator assembly is configured to feed air to and bleed air from the at least one tire of the truck or trailer based upon the pressure of the air spring $P_{AS}$ as a function of the load on the air spring ($F_{AS}$), and further upon the recommended pressure $P_T$ of the at least one tire as a function of the load on the tire ($F_T$).

In a third embodiment, the present invention provides a system as in any embodiment above, wherein the at least one tire is on an axle of a suspension having a suspension beam pivot, wherein the air spring is secured to the suspension, and the pressure regulator assembly is configured to feed air to and bleed air from the at least one tire of the truck or trailer so as to achieve the recommended pressure $P_T$ according to the equation:

$$P_T = 2K_{AS}L2P_{AS} \div K_T L1,$$

wherein $K_{AS}$ is the slope of a best fit line of $F_{AS}$ as a function of $P_{AS}$, wherein $F_{AS}$ is the load on the air spring, $K_T$ is the slope of a best fit line of $F_T$ as a function of recommended tire pressure $P_T$, wherein $F_T$ is the load on the tire, L1 is the horizontal distance between the suspension beam pivot and the centerline of the axle, and L2 is the horizontal distance between the suspension beam pivot and the centerline of the air spring.

In a fourth embodiment, the present invention provides a system as in any embodiment above, wherein the pressure regulator assembly includes: a control unit, a pressure transducer receiving air at pressure $P_{AS}$ and feeding a signal expressing pressure $P_{AS}$ to said control unit, a pressure transducer receiving air from the at least one tire at pressure Ptire and feeding a signal expressing pressure Ptire to said control unit, said control unit controlling a fill valve for feeding air to said at least one tire, and said control unit controlling an exhaust valve for bleeding air from said at least one tire according to said signals.

In a fifth embodiment, the present invention provides a system as in any embodiment above, wherein the control unit is configured to adjust the pressure Ptire in the at least one tire so that:

$$P\text{tire} = 2K_{AS}L2P_{AS} \div K_T L1$$

wherein $K_{AS}$ is a best fit linear slope of $F_{AS}$ as a function of $P_{AS}$, wherein $F_{AS}$ is the load on the air spring, $K_T$ is a best fit linear slope of $F_T$ as a function of $P_T$, wherein $F_T$ is the load on the tire, L1 is the horizontal distance between the suspension beam pivot and the centerline of the axle, and L2 is the horizontal distance between the suspension beam pivot and the centerline of the air spring.

BRIEF DESCRIPTION OF THE DRAWINGS

FIG. 4A provides air spring load characteristic data relating to the curves of FIG. 4;

DETAILED DESCRIPTION OF ILLUSTRATIVE EMBODIMENTS

Figure 1:
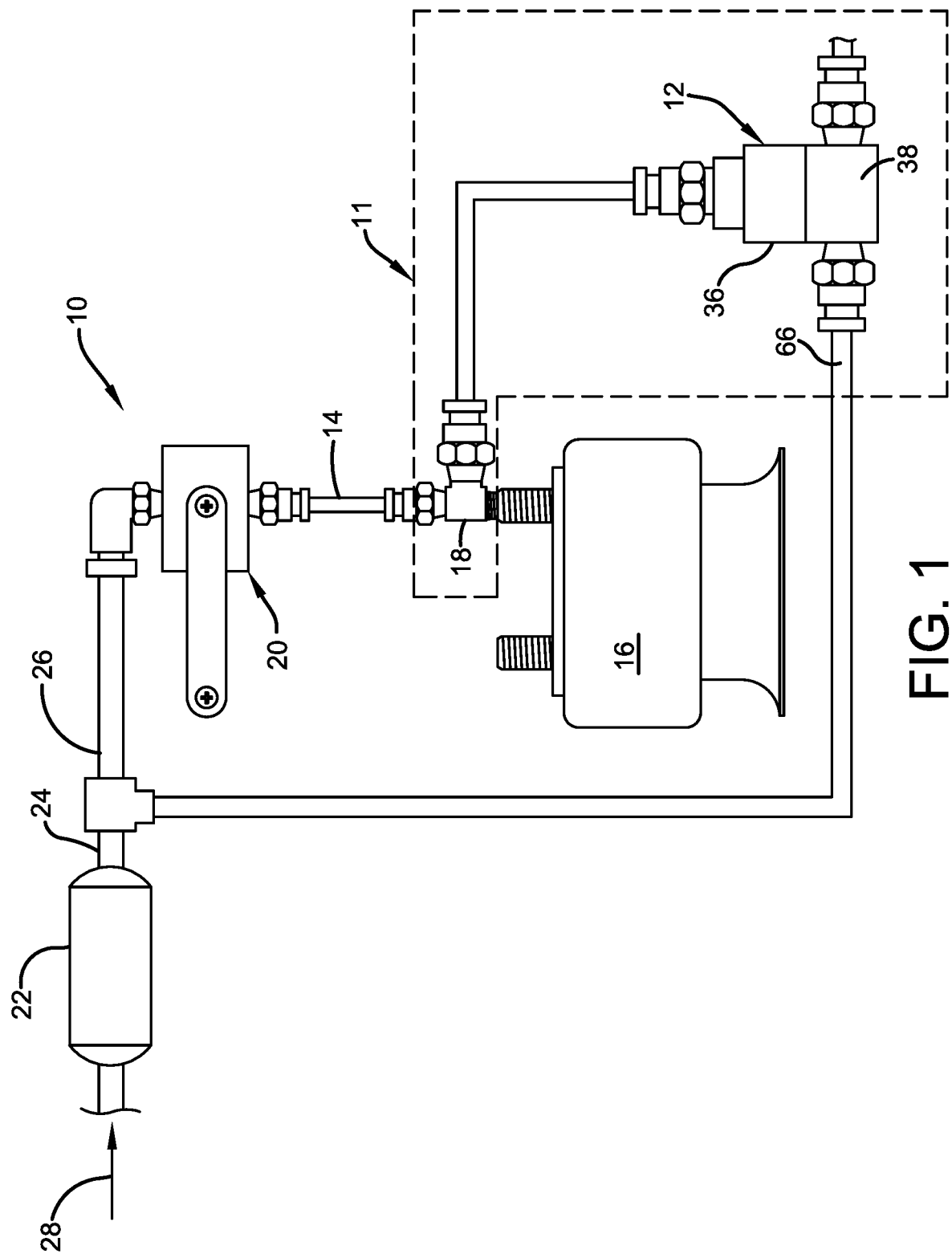
FIG. 1 is a schematic representation of a first embodiment of a load based tire pressure regulation system in accordance with this invention.

With reference to FIG. 1, an embodiment of a load based tire pressure regulation system is schematically shown and designated by the number 10. The system 10 includes a pressure regulator assembly 11 including an air pilot-operated relieving regulator 12 that is based on the common and integral relief regulators employed in tire inflation systems used on many semi-trailers, but is modified (see FIG. 2) as disclosed herein. The relieving regulator 12 is plumbed into the pressure supply conduit 14 to the air spring 16 through the tee joint 18 and thus receives air at the pressure supplied to the air spring 16, here $P_{AS}$. The air spring pressure ($P_{AS}$) is supplied by the height control valve (HCV) 20, which regulates the pressure into and out of the air spring 16 based upon the desired ride height of the trailer sub-structure relative to the center of the axle tube to maintain a set floor height on the trailer (see FIG. 3). The general functioning of the HCV 20 and the air spring 16 is known in the art. The HCV 20 adjusts the pressure in the air spring 16 when there is a change in the load on the trailer due to loading or unloading of cargo (or for any other reason).

The HCV 20 is connected to the air reservoir 22 of the trailer through conduits 24 and 26. As known, the air reservoir 22 is supplied with air pressure from the air compressor powered by the engine of the tractor pulling the trailer, and this know feature is generally shown at the arrow 28. The air spring 16 is a rolling diaphragm, rubber member that is mounted to the suspension 30 and the sub-structure 32 (FIG. 3) of the trailer and carries the load of the trailer as generally connoted by arrow 34 of FIG. 3. The air pressure in the air spring 16 creates a force against the trailer sub-structure 32 and the suspension structure 30 to maintain the ride height.

Figure 2:
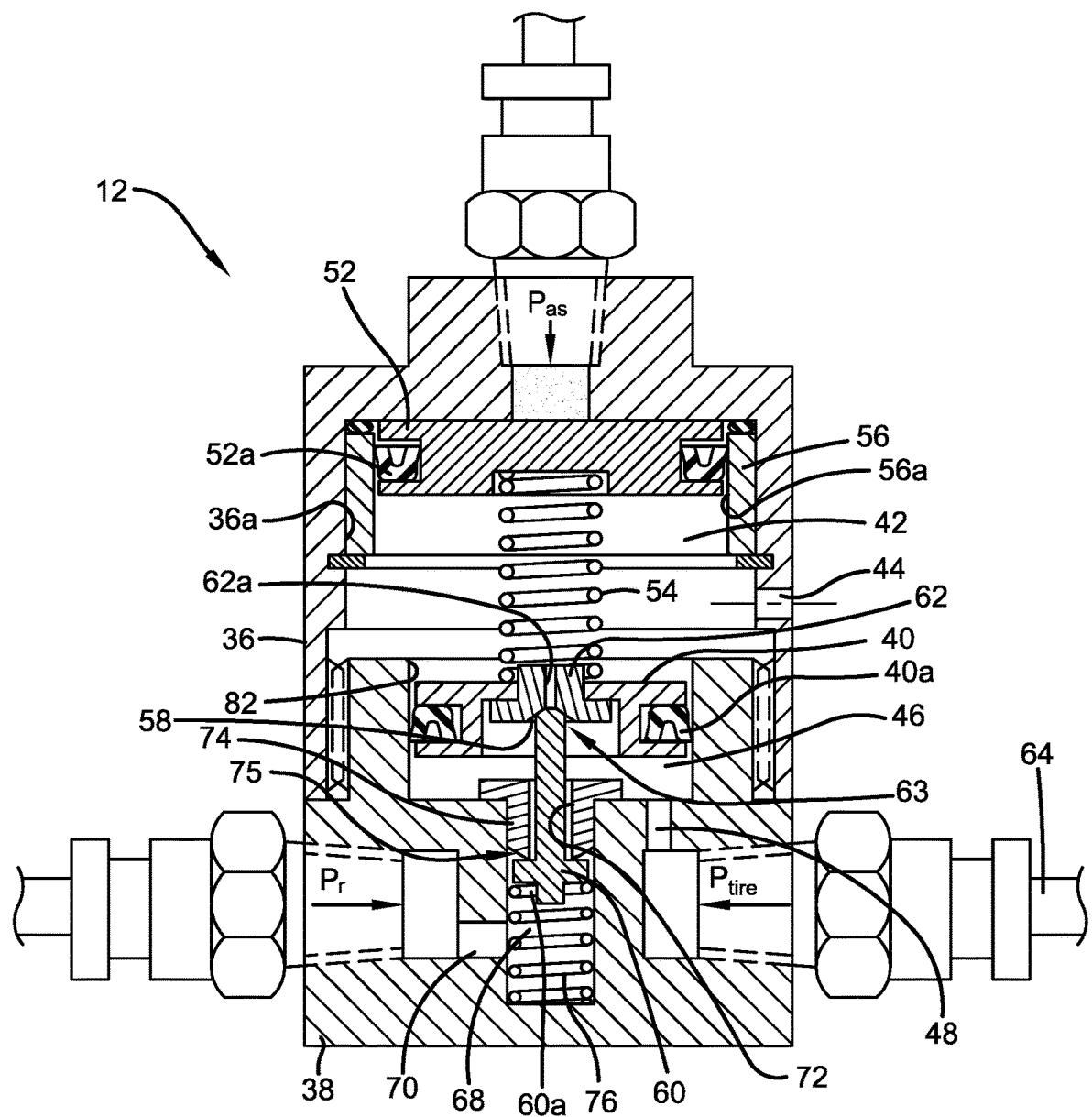
FIG. 2 is a cross-section view of a relieving regulator employed in some embodiments of the invention.

FIG. 2 provides a schematic cross section of the air pilot-operated relieving regulator 12 uniquely modified to receive air from the air spring at pressure $P_{AS}$ (i.e., the pressure of the air spring) as never before provided in the art. In some embodiments, the regulator 12 includes an upper body 36 and lower body 38 (in the orientation of the Figures), with an outlet piston 40 defining an exhaust chamber 42 feeding to an exhaust opening 44 on one side of the outlet piston 40, and defining a tire fill chamber 46 feeding to a tire fill opening 48. The exhaust chamber 42 is further defined by a pilot piston 52, which is separated from the outlet piston 40 by a regulating spring 54.

In some embodiments, the present invention advances the art in at least one aspect in that the relieving regulator 12 controls the inflation pressure setting of a tire or tires based upon the pressure $P_{AS}$ received from conduit 50 at a pilot port. In the upper body 36, the pressure $P_{AS}$ in conduit 50 bears against the top surface area of the pilot piston 52 and seal 52a which, in effect, is the area of bore 56a (in the orientation of FIG. 2), and thus exerts a force against the regulating spring 54. The pilot piston 52 is sealed to either the inner surface of the body of the regulator 12 or, in some embodiments, to an adaptor sleeve 56 (disclosed more fully below), by a seal 52a. The spring 54 extends between the pilot piston 52 and the outlet piston 40 such that forces exerted on pilot piston 52 and seal 52a are further exerted against the outlet piston 40. The outlet piston 40 includes a seal 40a, and a relief seat 58 which is the contact surface at a distal end of an inlet valve stem 60 where it contacts a relief orifice body 62 to block off a relief orifice 62a in the relief orifice body 62 to create an exhaust valve 63. Breaking contact at relief seat 58 by distancing the relief orifice body 62 from the inlet valve stem 60 allows the relief orifice 62a to permit fluid communication between the tire fill chamber 46 and the exhaust chamber 42.

The tire fill chamber 46 receives air from conduit 64 (at a delivery port) at the same pressure as the pressure of a tire or plurality of tires, herein represented as pressure Ptire, and this pressure acts on the surface area of the outlet piston 40 and seal 40a which, in effect, is the area of bore 82. It should be appreciated that a manifold can be employed in some embodiments to deliver air to more than one tire. Air incoming from air reservoir 22 through conduit 66 (at a supply port) at a reservoir pressure $P_R$ enters a staging chamber 68 defined between a feed orifice 70 and the entrance orifice 72 in fill chamber orifice body 74, where it is blocked by a seat member 60a on the valve stem 60 to create a fill valve 75.

As appreciated from the structure of FIG. 2, when the force against the outlet piston 40 from the direction of incoming air at $P_{AS}$ (downwardly in the orientation of FIG. 2) is greater than the force against outlet piston 40 from the direction of the backpressure Ptire (upwardly in the orientation of FIG. 2), a downward force from the pilot piston 52 will unseat the seat member 60a from the entrance orifice 72 by deflecting staging chamber bias spring 76, opening the fill valve 75 and air will flow from the conduit 66, through the feed orifice 70, the entrance orifice 72, the tire fill chamber 46, tire fill opening 48, and into the tire or tires through conduit 64. The relieving regulator 12 is structured so that this will occur when it is necessary to inflate the tire(s), particularly when due to an increase in the load on the trailer. In some embodiments, a manifold is employed to deliver air to more than one tire. In some embodiments, a manifold delivers air to all tires of a trailer. Thus, mention of tire or tires should be understood as being non-limiting as to the application of the system to singular or multiple or all tires. Similarly, such a manifold would deliver the backpressure Ptire from a plurality of tires to the tire fill chamber 46.

When the force against the outlet piston 40 from the direction of the incoming air at $P_{AS}$ (downwardly in the orientation of FIG. 2) is less than the force against outlet piston 40 from the direction of the backpressure Ptire (upwardly in the orientation of FIG. 2), an upward force from the outlet piston 40 will press against the spring 54 and unseat the valve stem 60 from the relief seat 58 of the orifice body 62, opening the exhaust valve 63, and air will flow from the conduit 64, through the tire fill opening 48, the tire fill chamber 46, the relief orifice 62a, the exhaust chamber 42, and out the exhaust opening 44 lowering the pressure in the conduit 64. The relieving regulator 12 is structured so that this will occur when it is necessary to deflate the tire(s), particularly when due to a decrease in the load on the trailer.

Using known data regarding (1) the relationship between the pressure of the air spring 16 ($P_{AS}$) as a function of the load on the air spring 16 ($F_{AS}$) for a given trailer, (2) the relationship between the recommended tire pressure $P_T$ as a function of the load on the tires ($F_T$), and (3) the relationship between $F_T$ and $F_{AS}$ as based on the locations of the axle and the air spring 16 relative to the suspension beam pivot (FIG. 3), the relieving regulator 12 is designed to fill or bleed the tire(s) (i.e. adjust Ptire) based on the changing of the load on the truck or trailer to bring the tire(s) closer to the appropriate recommended pressure $P_T$ based on the pressure $P_{AS}$, which is automatically adjusted upon a change in load on the trailer as per the standard operation with the HCV 20.

In some embodiments, the pilot piston 52 and seal 52a are installed in a bore 56a defined by an adapter sleeve 56 which is held in place by a retaining ring 78. The o-ring seal 80 seals air at $P_{AS}$ from conduit 50 from passing along the outside of the adaptor sleeve 56. Adjustment of the impact of the force of $P_{AS}$ on the valve stem 60 through impact on the pilot piston 52 and the outlet piston 40 and the force of Ptire against this pressure on the outlet piston 40 is made using appropriately sized adaptor sleeve 56, pilot piston 52, and seal 52a, as will be disclosed more particularly below. This allows for ease of assembly of different pilot operated relieving regulators by choosing an appropriate adapter sleeve 56 to achieve an appropriate surface area dimension for the pilot piston 52. By having an upper body 36 removable from a lower body 38, the appropriate adapter sleeve 56 could be installed in the upper body 36 for a given system, to interact with a standardize lower body 38 and associated elements, the valve stem 60, the spring 76, fill chamber orifice body 74, the outlet piston 40, and relief orifice body 62, with set dimensions.

The system is based in part on known data of the relationship between the pressure of the air spring 16 ($P_{AS}$) and the load on the air spring 16 ($F_{AS}$) for a given trailer to be held at a given height. Each air spring 16 has a functional load capacity vs. height curve, FIG. 4, available from the original equipment manufacturer (OEM). The table in FIG. 4A provides characteristic data, including, at the far right column, the data graphically shown in FIG. 4 for a particular air spring, the Firestone 1T19L-5. From data such as this, one can develop data relating the load capacity of the air spring 16 to the pressure $P_{AS}$ from conduit 50 from the HCV 20. In FIG. 4, the installed height of air spring 16 of 7 inches at a particular design ride height of the suspension is marked with 'dots' on each load curve for inflation pressures 20, 40, 60, 80, 100, 120. The, respective, Loads are 2100, 4100, 6150, 8200, 10,100, and 12,400 pounds. Pressure ($P_{AS}$) versus load ($F_{AS}$) on the air spring 16 can be graphed, as at FIG. 4B, showing the graph of data for a load at 7 inches ride height (in solid) and the slope of a best fit linear line (dashed line) used to generate a $K_{AS}$ factor. In some embodiments, since the pressure $P_{AS}$ from the HCV 50 to the air spring 16 has a +/-5 psi tolerance per the HCV manufacturer, a "linear" constant factor $K_{AS}$ relating the load on the air spring 16 $F_{AS}$ to the pressure $P_{AS}$ at conduit 50 is sufficient. In other embodiments, a higher order polynomial fit might supply the $K_{AS}$ factor. Considering a linear constant factor $K_{AS}$, and with reference to FIG. 3, the relationship equation for the 2 air springs installed on a typical suspension 30 will be:

$$F_{AS}=[2 \times K_{AS}] \times P_{AS} \quad (1).$$

The load on the air spring 16, $F_{AS}$, is represented at arrow 34. Thus equation (1) relates the pressure $P_{AS}$ and the load $F_{AS}$ on the air spring 16.

Similarly, the system is based in part on known data of the relationship between the recommended pressure of the tire(s) $P_T$ and the load on the tire(s) $F_T$ for a given type of tire. Each tire has characteristic load capability vs. inflation pressure data available from the original equipment manufacturers (OEM) published tire data. Thus, as known, such data is available for a commonly used tires, such as the 11R22.5 tire, when used in a dual tire wheel end configuration and the 455/55R22.5 steer tire, when used in a single tire wheel end configuration. The data for each tire are graphed in FIGS. 5 and 6, respectively. With the knowledge that tire manufacturers allow a +/-5 PSI tolerance in the inflation pressure of the tires relative to the calibration of tire gauges, developing a "linear" constant factor, $K_T$ relating the load on the tire(s), $F_T$ to the recommended inflation pressure of the $P_T$ is sufficient. In other embodiments, a higher order polynomial fit might supply the $K_T$ factor. The relationship equation for the tire will be:

$$F \text{ axle}=F_T=[K_T] \times P_T \quad (2).$$

Figure 3:
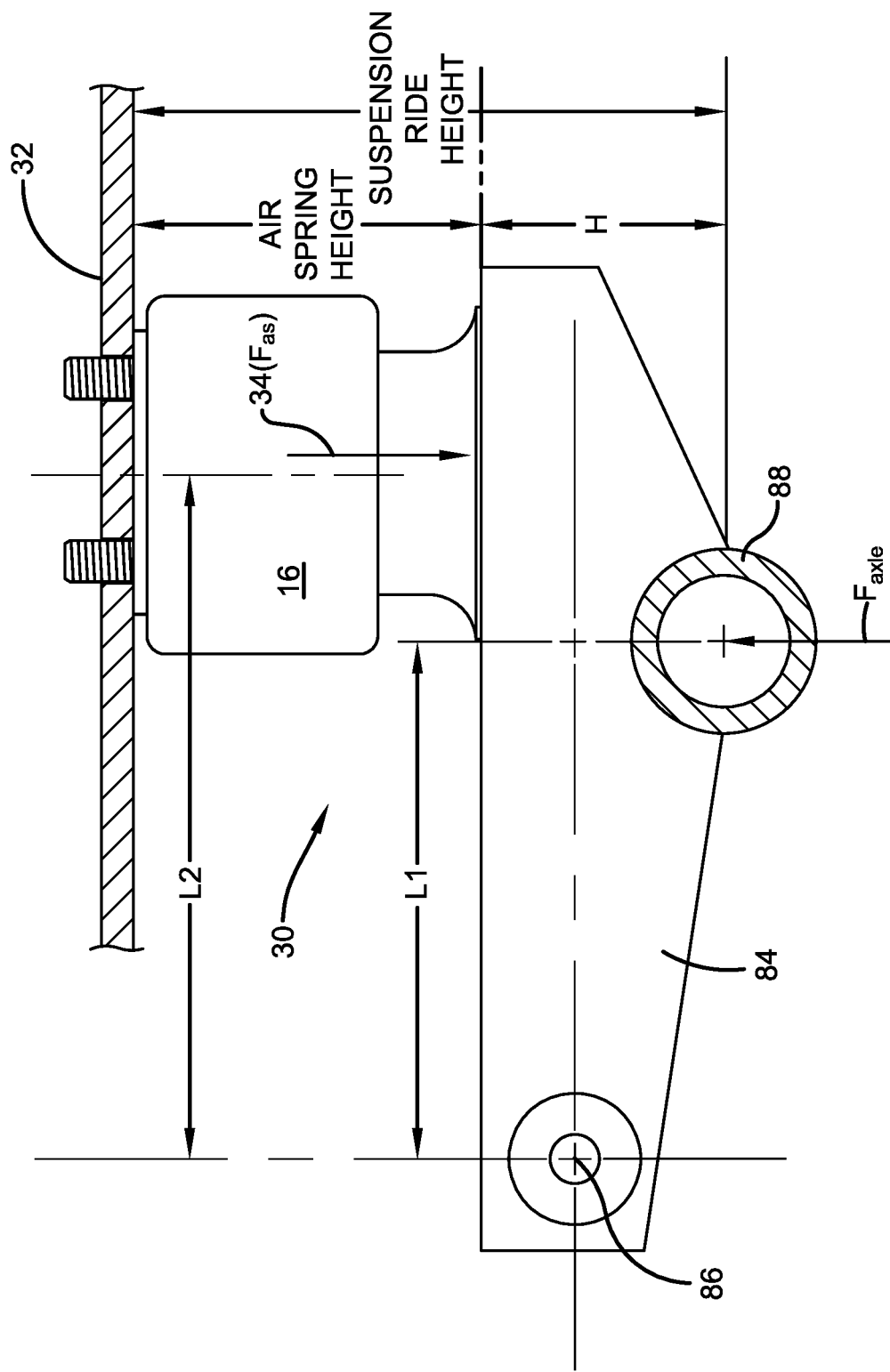
FIG. 3 is a schematic representation of a suspension system for a truck or trailer.
Figure 4:
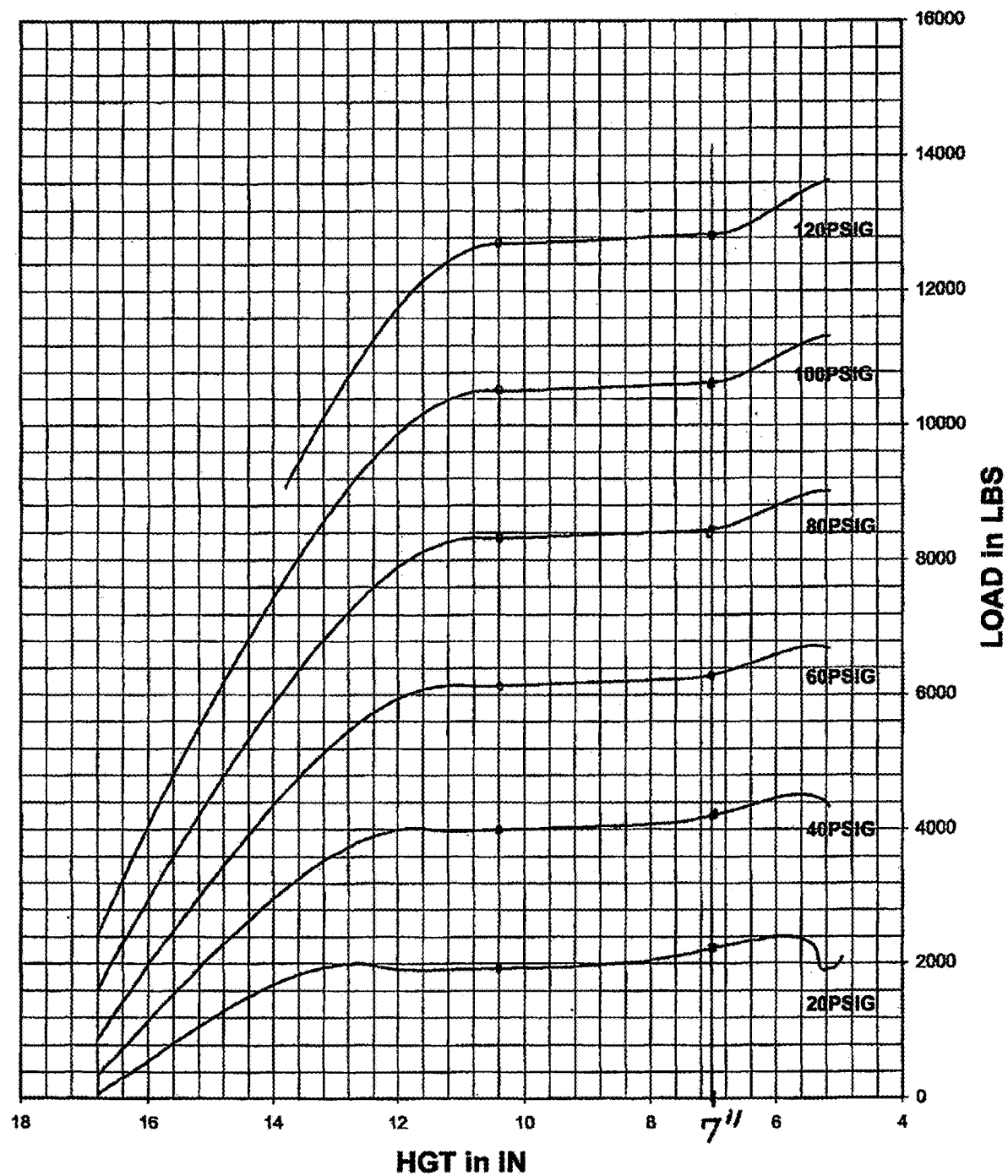
FIG. 4 provides functional load capacity versus height curves for an air spring.
Figure 4B:
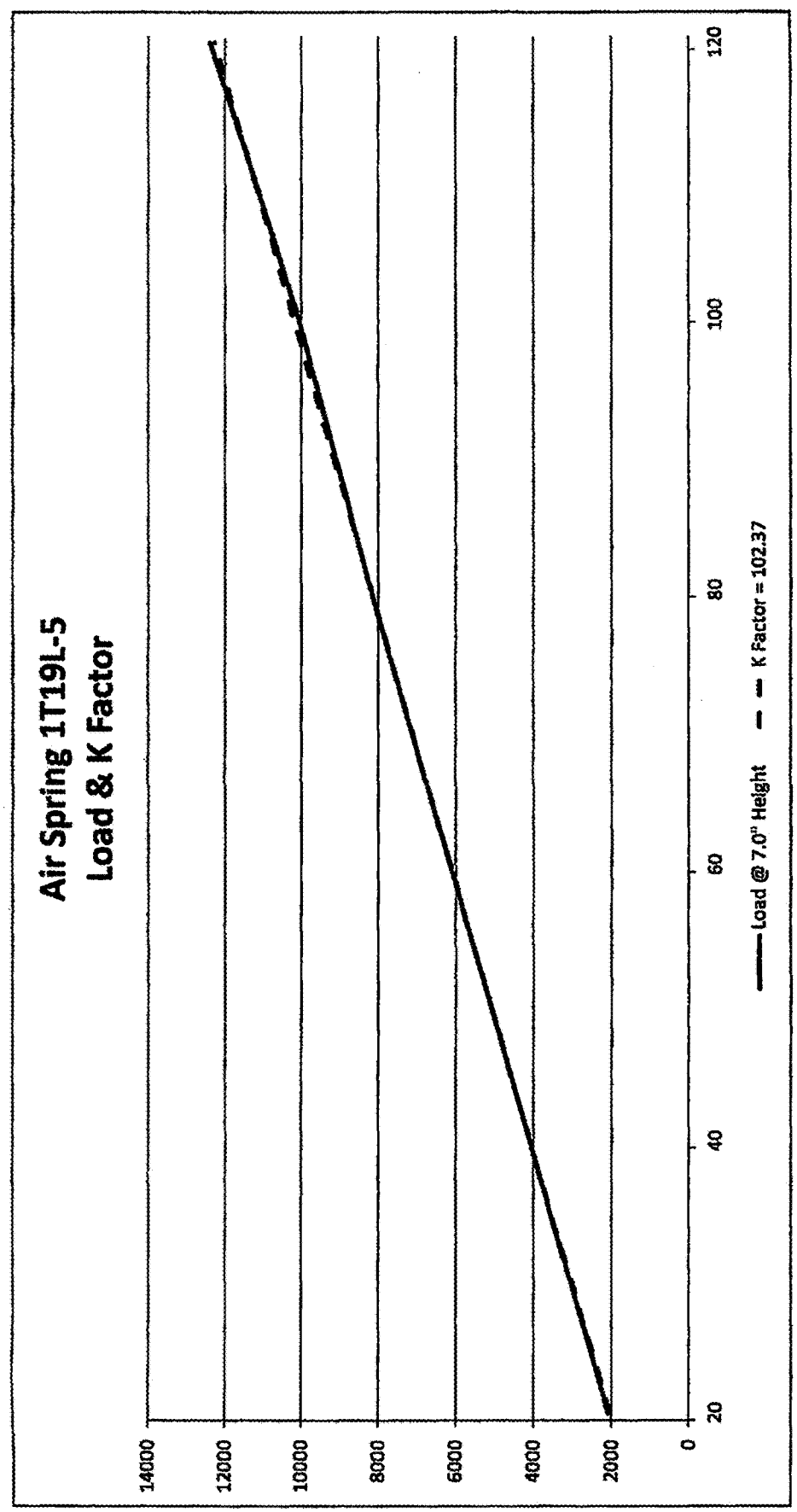
FIG. 4B provides the pressure versus load data in graphed form for the load at 7 inches ride height as shown in FIG. 4 and represented by the appropriate data in FIG. 4A.

The system is based in part on known data regarding the relationship between $F_T$ and $F_{AS}$ as based on the locations of the axle and the air spring 16 relative to the suspension beam pivot (FIG. 3), taking into account the lever length ratio of suspension 30 and air spring 16 as exemplified in FIG. 3. The air spring 16 mounts to the underside of trailer substructure 32 and to suspension beam 84 at a distance L2 from suspension beam pivot 86. The axle 88 of suspension 30 is attached to suspension beam 550 at a distance L1 from suspension beam pivot 86. This arrangement creates a second class lever system. Moments about suspension beam pivot 86 can be calculated as the load (Faxle) on the axle 88 multiplied by the Length L1 is equal to the load on the air spring ($F_{AS}$) multiplied by the Length L2, or:

$$F \text{ axle} \times [L1]=[L2] \times F_{AS}$$

$$F \text{ axle}=F_T=[L2/L1] \times F_{AS} \quad (3).$$

As air spring 16 is moved farther away from pivot 86, it is capable of exerting a greater force $F_{AS}$ onto axle 88 or, in another sense, requires less air pressure to support the same Load. If it is mounted directly above axle 88, there is no mechanical advantage (L2/L1 is 1); $F_{AS}$ equals Faxle equals $F_T$. From the last two characteristics, $F_{AS}=[2K_{AS}P_{AS}]$ and F axle=[L2/L1]×$F_{AS}$, a relationship can be created to transform Air Spring 16 Pressure into F axle. The combined equations become:

$$F \text{ axle}=F_T=[2K_{AS}(L2/L1)] \times P_{AS} \quad (4).$$

Replacing $F_T$ with equation (3) and solving for $P_T$:

$$P_T=[2(K_{AS}/K_T) \times (L2/L1)] \times P_{AS} \quad (5).$$

The term in brackets is the transfer function for $P_T/P_{AS}$=[K Components] and is the relationship of air spring, tire, and suspension components:

$$P_T/P_{AS}=[K \text{ Components}]=[2 \ K_{AS}L2] \div [K_T L1] \quad (6).$$

The ratio of the recommended pressure in the tire(s) ($P_T$) is now related to the pressure ($P_{AS}$) established by the air spring 16 through HCV 20 and by K factors $K_{AS}$ and $K_T$ (obtainable as exemplified in FIGS. 4B, 5A, 6A) and the known dimensions L1 and L2. The design parameters of the specially modified, pilot operated, relieving regulator 12 are defined by the air spring pressure, the tire inflation pressure, and the effective areas 82, 56a of pistons 40, 52. For purposes herein, the effective area of pilot piston 52, adapter sleeve 56, and seal 52a, is the area of bore 56a of adapter sleeve 56 (if employed) or the area of bore diameter 36a of the upper body 36 (if the adapter is not employed). In the latter case, the upper body 36 would be manufactured with an appropriate diameter at bore 36a, as will be more apparent below. This is the area receiving pressure $P_{AS}$ from conduit 50 and sealed by the pilot piston 52 and the seal 52a. Similarly, the effective area of outlet piston 40 and seal 40a is the area of bore 82 of the lower body 38. This is the area receiving pressure Ptire from conduit 64 and sealed by outlet piston 40 and seal 40a. The regulator 12 is designed so that pressures balance and the regulator is closed when the pressure Ptire is at the recommended pressure $P_T$ for a particular load establishing a particular pressure $P_{AS}$. Thus, the effective area of bore 82 multiplied by the appropriate recommended tire pressure $P_T$ coming from conduit 64 equals the effective area of bore 56a multiplied by the air spring pressure $P_{AS}$ coming through conduit 50 to have the relationship:

Effective Area $82a \times P_T$=Effective Area $56a \times P_{AS}$

Now, the area of a circle=$\pi r^2$, and since r=D/2, Area=$\pi \times (D/2)^2 = (\pi/4) \times D^2$.

$(\pi/4) \times (D82)^2 \times P_T = (\pi/4) \times (D56A)^2 \times P_{AS} (D82)^2 \times P_T = (D56A)^2 \times P_{AS}$.

Rearranging terms and solving for $P_T$:

$$P_T = [(D56A)^2/(D82)^2] \times P_{AS} \qquad (7)$$

Again, the term in brackets is the transfer function for $P_T/P_{AS}$=[K Components] for the effective area of bore 82 and bore 56a.

$$P_T/P_{AS} = [K\ Components] = [(D56A)^2/(D^{82})^2] \qquad (8)$$

The two [K Components] terms in (6) and (8) can be equated, $$[(D56A)^2/(D82)^2] = [2(K_{AS})(L2)] \div [(K_T)(L1)] \qquad (9)$$

and, $$(D56A)^2 = [2(K_{AS})(L2)(D82)^2] \div [(K_T)(L1)] \qquad (10)$$

Now, the necessary ratio of the dimensions for the bore 56a and the bore 82 can be calculated based on known data (equation (9)). When a standardized bore 82 is employed and thus D82 is known, the necessary dimension D56A of the bore 56a (and thus the pilot piston 52 and seal 52a) can be approximated based upon calculable K factors and known dimension L1, L2, and the dimensions (thickness) of an appropriate adapter sleeve 56 can be calculated, if necessary, to adjust the bore 36a of an upper body not utilizing a sleeve. Similarly, when a standardized pilot piston bore 56a is employed and thus D56A is known, the necessary dimension D82 of the bore 82 (and thus the outlet piston 40 and seal 40a) can be approximated based upon calculable K factors and known dimension L1, L2, and the dimensions (thickness) of an appropriate adapter sleeve could be calculated, if necessary, to adjust the bore 82 of a standardized upper body. Relieving regulators 12 can thus be manufactured to specific dimensions for specific combinations of air springs, tires, and suspensions. With a standardized lower body 38 and associated elements, the valve stem 60, the spring 76, fill chamber orifice body 74, the outlet piston 40, and relief orifice body 62, appropriate adapter sleeves can be employed to tailor the system by varying sizes of pilot piston 52. A family of pilot piston and adaptor sleeve components can be developed for the myriad combinations of air springs, tires, and suspensions.

With this balancing of the sizing of the bore 56a and the bore 82, the tire pressure Ptire is ensured to be retained at or near the recommended pressure $P_T$ as based on the load on the truck or trailer. The valves of the relieving regulator 12 remain closed when the tire pressure Ptire is at or near (within tolerances of the equations used and best fit K factors) the recommended pressure $P_T$ for the load, but, as load is increased, the pressure $P_{AS}$ of the air spring 16 increases (via HCV 20) and this disturbs the balance at regulator 12, causing pilot piston 52 to open the valve stem 60 off of the fill chamber orifice body 74 allowing air from the air reservoir 22 to fill the tire(s) to a more appropriate pressure to be better optimized for the increased load. Similarly, as load is decreased, the pressure $P_{AS}$ of the air spring 16 decreases (via HCV 20) and this disturbs the balance at regulator 12, causing Ptire to open the outlet piston 40 off of the valve stem 60 allowing air from the tire(s) to vent at exhaust opening 44 until the pressure in the tire(s) reaches a more appropriate pressure to be better optimized for the decreased load.

Two examples of air spring, lever ratio, and tire characteristics will be calculated to show the process.

The load $F_{AS}$ on air spring 16 vs. height of a 1T19L-5 air spring 16 is shown in FIG. 4. From it, the data in FIG. 4A was recorded. The data at design height 7.00" is plotted in FIG. 4B. The slope of the data is expressed as the K Factor $(K_{AS})$=102.37.

Figure 5:
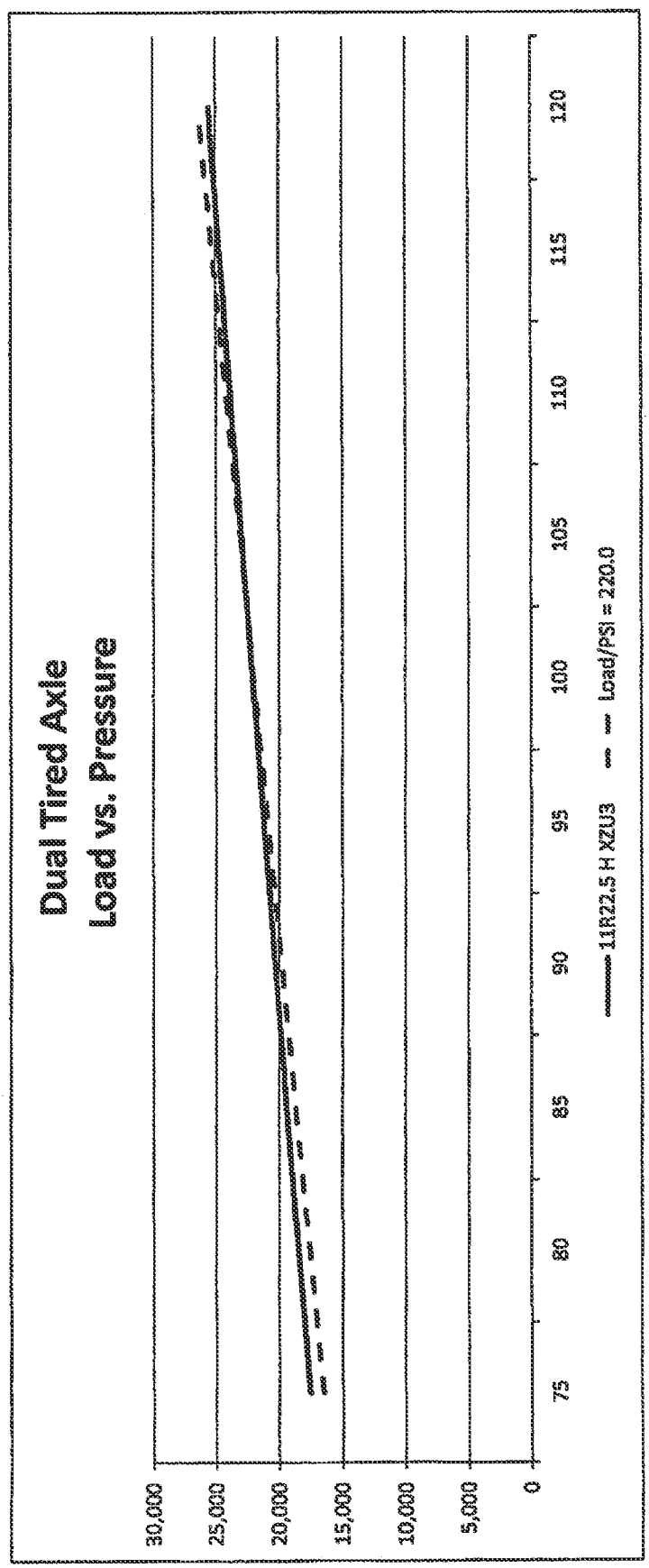
FIG. 5 shows a graph of the recommended tire pressure for a given load, for a Michelin™ 11R22.5 tire (Michelin; Clermont-Ferrand, France.
Figure 6:
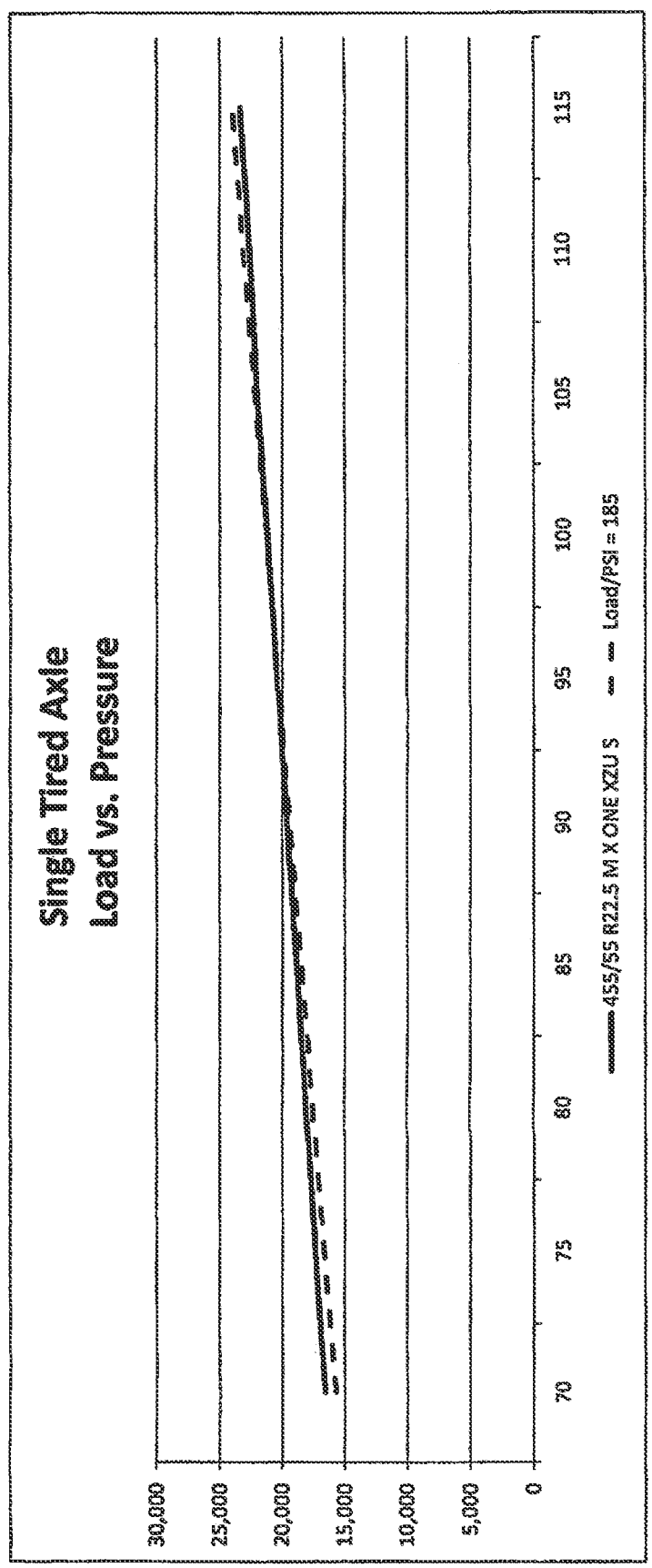
FIG. 6 shows a graph of the recommended tire pressure for a given load for a Michelin™ 455/55R22.5 tire (Michelin; Clermont-Ferrand, France)

FIG. 5 shows data for a dual tire wheel end configuration with 11R22.5 tires that are very common on heavy trucks and trailers. From the tire manufacturer's published load capacity vs. inflation pressure for a dual tire wheel end equipped axle, the data is plotted and a reasonable K Factor $(K_T)$=220.0 lbs/psi is found. FIG. 6 shows the published load capacity vs. inflation pressure for a single tire wheel end 445/55R22.5 wide base steer tire equipped axle. The data is plotted and a reasonable K Factor $(K_T)$=185.0 lbs/psi is found.

In FIG. 3, trailing arm suspension 30 is similar to one very common in the industry. Air spring 16 is located at distance L2=29.00" from pivot 86 and axle tube 88 is located at distance L1=26.00" from pivot 86. In another trailing arm suspension 30, air spring 16 could be located directly above the axle tube 88 so L2=L1=26.00". The height of air spring 16 is established by subtracting beam height H from suspension ride height, the dimension from the center of the axle tube 88 to air spring 16 mounting surface (the sub structure 32). Therefore, Air Spring Height=Ride Height–H.

Lastly, the diameter of a standardized regulator outlet piston 40 is $D82=1.062"$.

Configuration One
Trailing Arm Suspension with Air Spring L2=29.00", L1=26.00"
1T19L-5 Air Spring at 7.00" Design Height, $K_{AS}$=102.37
11R22.5 Dual Tires on Axle, $K_T$=220.0
Calculate the value for D56A as:

$(D56A)^2 = [2(K_{AS})(L2)(D82)^2] \div [(K_T)(L1)]$ $(D56A) = [2 \times (102.37\ lbs/psi) \times (29.00\ in) \times (1.062\ in)^2] \div [(220.00\ lbs/psi) \times (26.00\ in)]$ $(D56A) = 1.171\ in^2$ $D56A = 1.082"$ Configuration Two
Trailing Arm Suspension with Air Spring L2=26.00", L1=26.00"
1T19L-5 Air Spring at 10.4" Design Height, $K_{AS}$=98.09
445/55R22.5 Wide Base Tires on Axle, K tires=185.00
Calculate the value for D56A as:

$$(D56A) = [2 \times (98.09 \text{ lbs/psi}) \times (26.00 \text{ in}) \times (1.062 \text{ in})^2] \div [(185.00 \text{ lbs/psi}) \times (26.00 \text{ in})]$$

$$(D56A) = 1.126 \text{ in}^2$$

$$D56A = 0.773"$$

Figure 7:
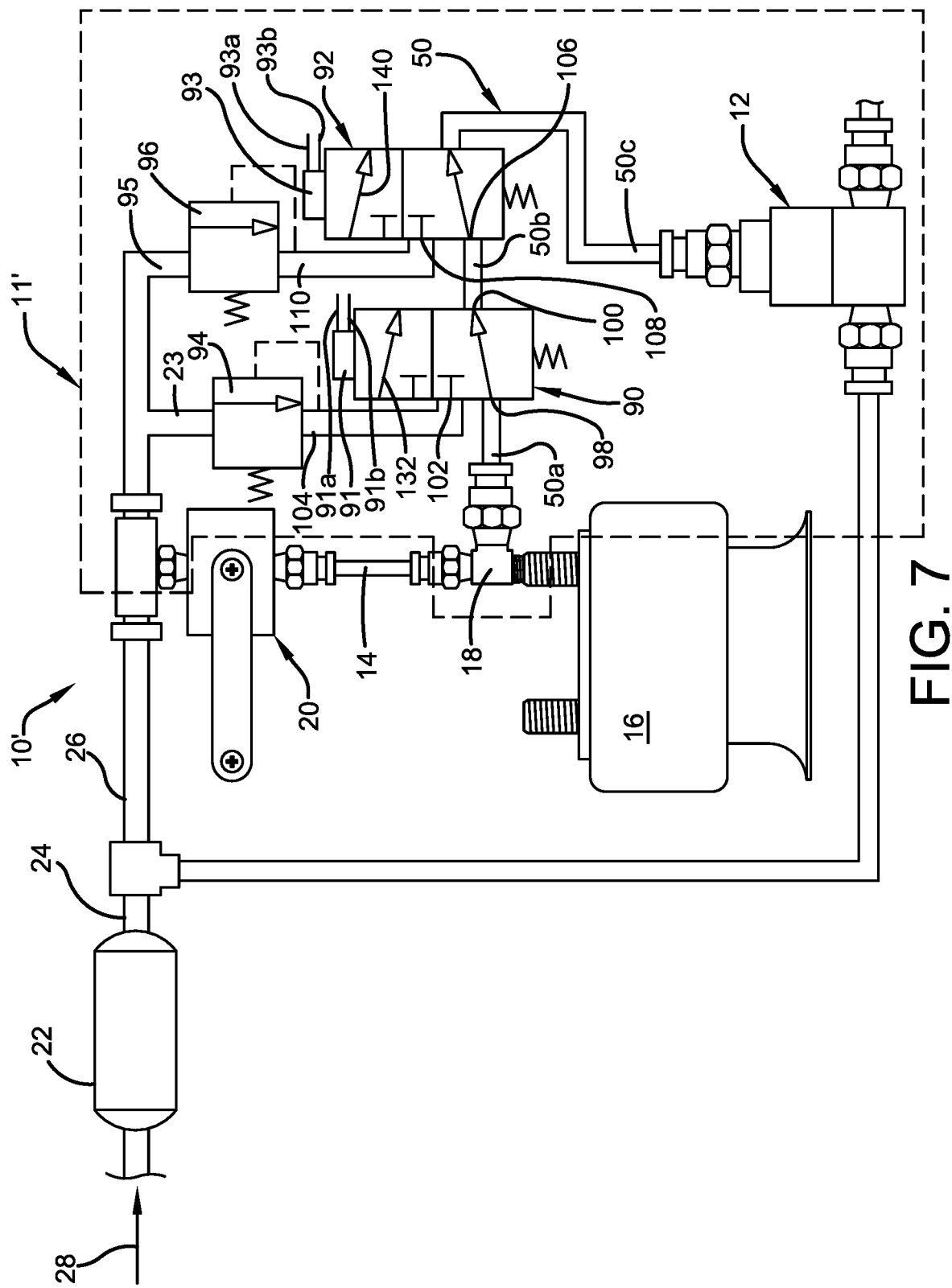
FIG. 7 is a schematic representation of another embodiment of a load based tire pressure regulation system in accordance with this invention.

FIG. 7 provides a second embodiment of a load based tire inflation system 10'. This system provides a pressure regulator assembly 11' that allows for user/driver selection of a minimum inflation mode and user-selected inflation mode Like parts receive like numerals, and this embodiment introduces solenoid valves 90, 92 and regulators 94, 96 in the conduit 50 between the tee 18 and the pilot operated relieving regulator 12, creating conduits 50a, 50b, 50c. The air spring pressure $P_{AS}$ from the tee 18 is plumbed into the normally open port 98 of first two position solenoid valve 90 and directs the air spring pressure to the common port 100 of first two position solenoid valve 90 in the de-energized state. The normally closed port 102 of first two position solenoid valve 90 is plumbed to the outlet port of relieving pressure regulator 94 through conduit 104. In some embodiments, a relieving pressure regulator 94 is supplied with air pressure from air reservoir 22 at conduit 23 and is adjusted to deliver the minimum tire inflation pressure that is permitted by the tire manufacturer for use in the emergency pressure mode of operation when in sand or mud conditions (the aforementioned minimum inflation mode). The normally open port 106 of the second solenoid valve 92 is connected to the common port 100 of the solenoid valve 90, and delivers the air pressure to specially modified, air pilot operated, relieving regulator 12 through conduit 50c, and specially modified, air pilot operated, relieving regulator 12 will operate as originally described above. The normally closed port 108 of the solenoid valve 92 is plumbed to the outlet port of relieving pressure regulator 96 through conduit 110. The pressure regulator 96 is supplied with air pressure from the air reservoir 22 at conduit 95 and is adjusted, manually, by the driver of the tractor to deliver a tire inflation pressure that is used in a variable mode of operation.

Figure 7A:
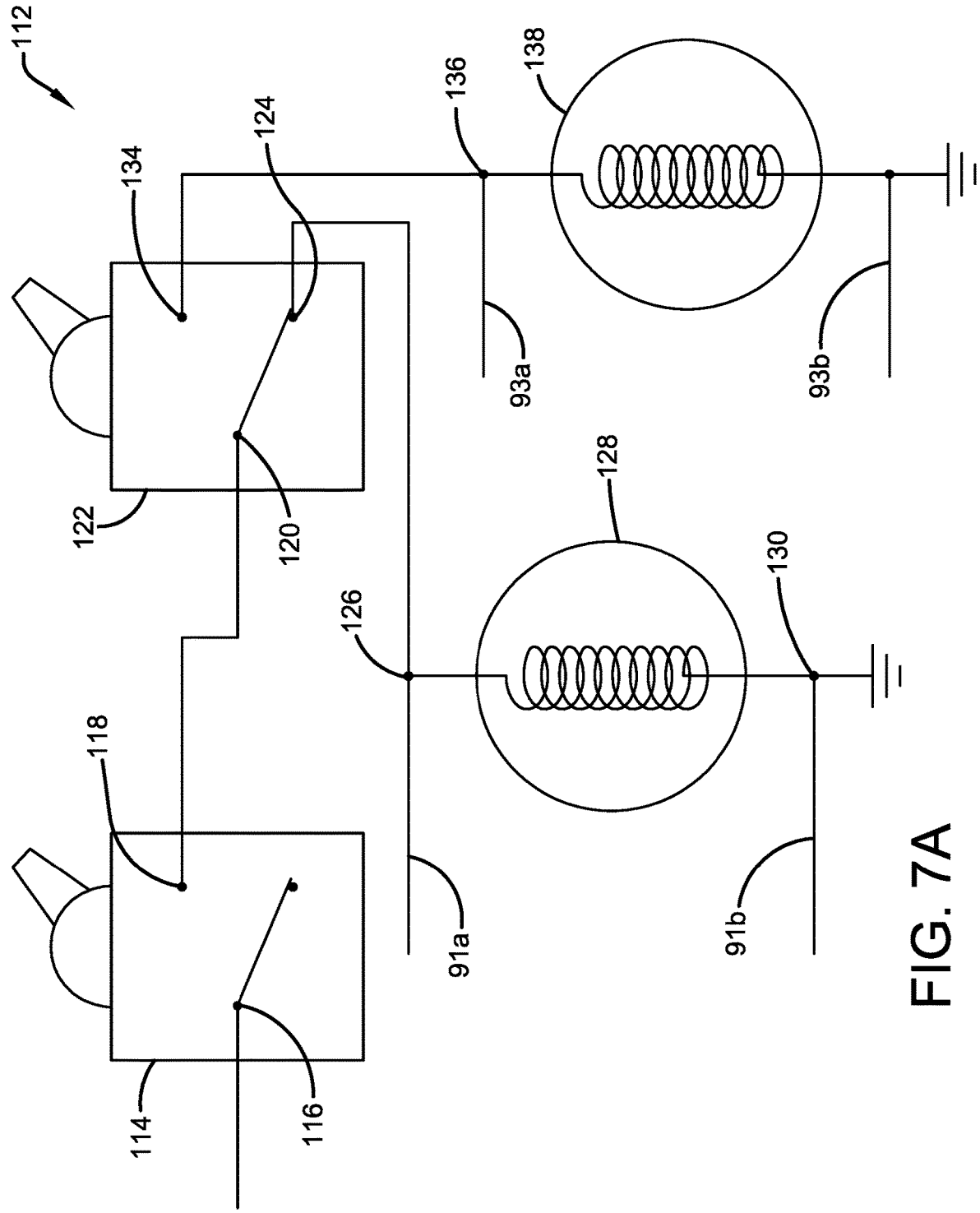
FIG. 7A provides an example of a control circuit.

FIG. 7A shows a control circuit 112 intended to be mounted in the cab of the tractor close to the driver. This circuit 112 controls the two solenoid valves 90, 92 and to select the desired delivery pressure to specially modified, air pilot operated, relieving regulator 12. A first switch 114 receives a 12 volt supply voltage from the tractor at common terminal 116. The normally open terminal 118 of first switch 114 is wired to the common terminal 120 of a second switch 122. The normally closed terminal 124 of second switch 122 is wired to junction 126, conductor 91a of solenoid 91 on the solenoid valve 90, and the positive voltage terminal of indicator lamp 128. The ground conductor 91b of solenoid 91 is wired to junction 130, the negative voltage terminal of indicator lamp 128, and vehicle ground.

With switches 114 and 122 as shown, neither solenoid 91 nor solenoid 93 will be supplied with 12 volt power. The first two position solenoid valve 90 will deliver the air pressure from conduit 50a directly to common port 100 of the solenoid valve 90 and to normally open port 106 of the solenoid valve 92 and through to conduit 50c as represented by the arrows in FIG. 7. Pressure at $P_{AS}$ is thus delivered to the pilot operated, relieving regulator 12.

When switch 114 is actuated, common terminal 116 of switch 114 will supply 12 V power to the normally open terminal 118 of switch 114 and on to common terminal 120 of switch 122. Common terminal 120 is connected to normally closed terminal 124 of switch 122 and passes the 12 V power to junction 126, conductor 91a of solenoid 91 on the solenoid valve 90, and positive voltage terminal of indicator lamp 128. Indicator lamp 128 will illuminate and the first two position solenoid valve 90 will shift joining (i.e. opening) port 102 to port 100 as represented by the arrow 132. Emergency regulated pressure $P_E$ from relieving pressure regulator 94 will be delivered through conduit 104 to normally closed port 102 of the solenoid valve 90 to common port 100 and to the solenoid valve 92 at normally open port 106 and on through to conduit 50c. Under this emergency pressure mode, the tires will be inflated with the lowest recommended tire inflation pressure the tire manufacturer will permit. The low inflation pressure in the tires will provide a large "footprint" of the tire to the ground surface to maximize adhesion.

If switch 122 is actuated along with switch 114, 12 V power will be removed from normally closed terminal 124 of switch 122 and solenoid 91 of the solenoid valve 90 will de-energize shifting the first two position solenoid valve 90 to the normally open porting condition (FIG. 7) and indicator lamp 128 will extinguish. The common terminal 120 will now be connected to normally open terminal 134 of switch 122 and the 12 V power will pass to junction 136, conductor 93a of solenoid 93 on the solenoid valve 92, and positive voltage terminal of indicator lamp 138. The indicator lamp 138 will illuminate and the second two position solenoid valve 92 will shift joining (i.e. opening) port 108 to conduit 50c, as represented by the arrow 140. Driver controlled regulated pressure from relieving pressure regulator 96 will be delivered through conduit 110 to port 108 and through solenoid valve 92 (at arrow 140) to conduit 50c. Under this driver controlled regulated pressure, the tires will be inflated with a tire inflation pressure Preg which the driver perceives is an appropriate pressure for the current conditions of operation. The driver controlled regulated inflation pressure in the tires will provide an intermediate "footprint" of the tire to the ground surface for adhesion, and specially modified, air pilot operated, relieving regulator 12 will operate as originally described above.

De-activating switch 122 and switch 114 will extinguish both indicator lamps and return the delivery pressure in air spring 16 through conduit 50 to specially modified, air pilot operated, relieving regulator 12.

Figure 8:
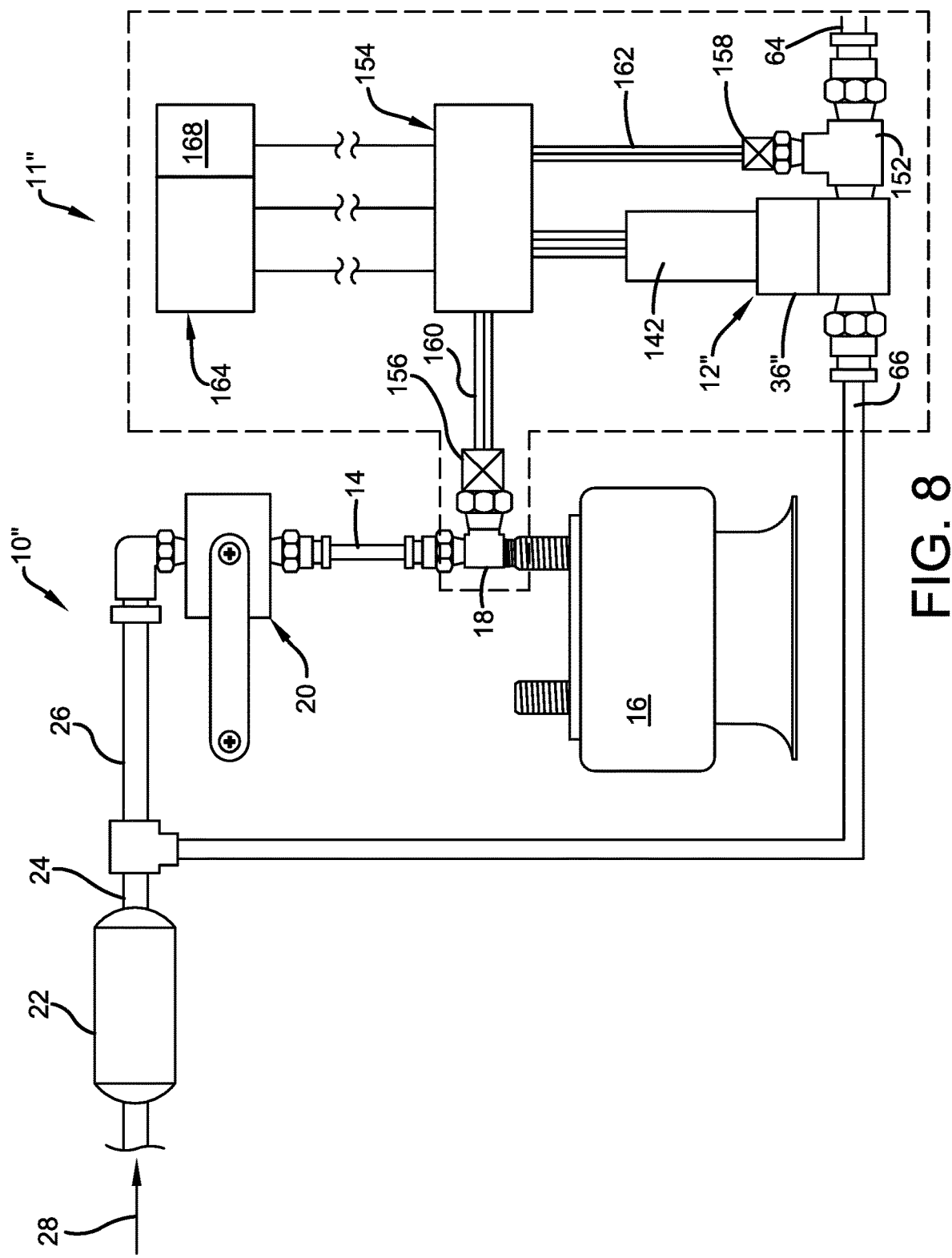
FIG. 8 is a schematic representation of another embodiment of a load based tire pressure regulation system in accordance with this invention.
Figure 9:
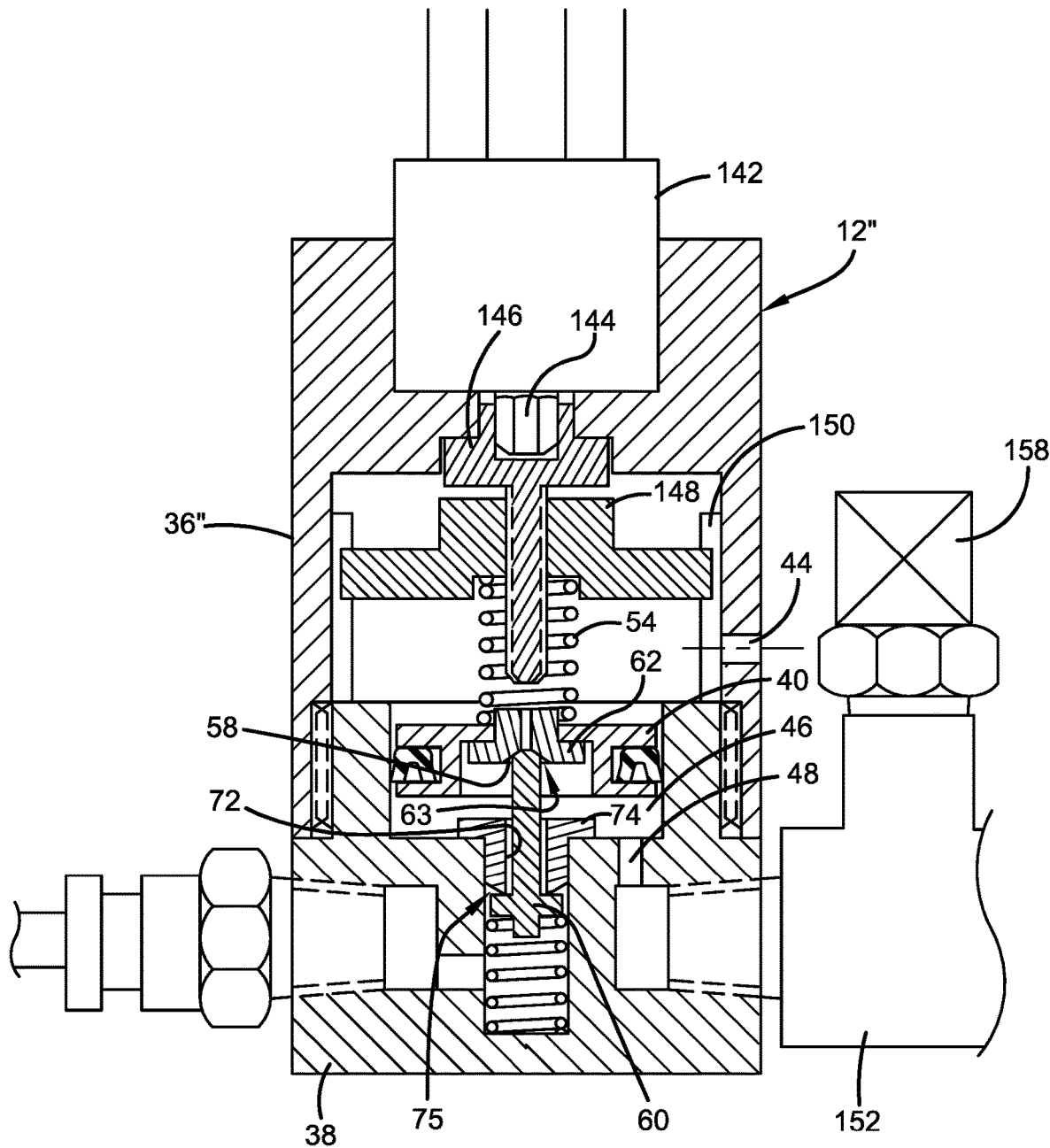
FIG. 9 is a cross-section view of a relieving regulator employed in some embodiments of the invention.

FIGS. 8 and 9 provide a third embodiment of the load based tire pressure regulation system 10" having a pressure regulator assembly 11" a motor driven relieving, air pressure regulator 12" is similar to the specially modified, air pilot operated, relieving regulator 12 except that upper body 36" includes a motor 142 with hex shaft 144, drive coupling lead screw 146, and anti-rotation lead nut 148 held against rotation by interaction with one or more slots 150. The drive coupling lead screw 146, and outlet piston 40 are connected by regulating spring 54.

With motor shaft rotation in a first direction (e.g. clockwise direction), the anti-rotation lead nut 148 will move toward outlet piston 40 compressing regulating spring 54 urging outlet piston 40 to push inlet valve stem 60 away from fill chamber orifice body 74 allowing air pressure from conduit 66 to flow through the entrance orifice 72, tire fill chamber 46, tire fill opening 48, and into tee 152 and conduit 64. With motor shaft rotation in an opposite direction (e.g. counter-clockwise), the anti-rotation lead nut 148 will move away from outlet piston 40 relaxing regulating spring 54 causing outlet piston 40 and inlet valve stem 60 to move upward closing entrance orifice 72 ceasing the flow of air pressure to tee 152 and conduit 64. With sufficient motor rotation in the counterclockwise direction, relief orifice body 62 will move away from inlet valve stem 60 at relief seat 58 permitting air in conduit 64 to flow to exhaust opening 44 through orifice 62a. The motor 142 can be any suitable motor, for example a stepper motor or DC motor.

An electronic control unit (ECU) 154 will have the appropriate components to drive the motor 142. The ECU 154 provides power to first pressure transducer 156 and second pressure transducer 158 and receives pressure signals 160 and 162, respectively. ECU 154 compares the signal voltage 160 from first pressure transducer 156 to signal voltage 162 from second pressure transducer 158 to the [K Components] term as derived above and sends an appropriate control signal to motor driven pressure regulator 12″ to achieve the desired [K components] ratio. Ptire is adjusted to a desired recommended pressure $P_T$ using Equation 6, wherein Ptire (from transducer 158)÷$P_{AS}$ (from transducer 156) is compared to [K Components]=[2 $K_{AS}$L2]÷[$K_T$L1], and since $K_{AS}$, $K_T$, L1, and L2 are all known, the ECU 154 can compare the ratio Ptire/$P_{AS}$ to the known [K Components] value of $P_T$/$P_{AS}$ and adjust accordingly using the motor 142. If the ratio Ptire/$P_{AS}$ as known from the signals provided by the transducers 158, 156 is higher than [K Components], the pressure in the tire is too high, and Ptire will be decreased by relaxing regulating spring 54 as mentioned above, to allow opening of exhaust valve 63, until signals show the ratio is equal to [K Components], at which time the motor will be driven to close the exhaust valve 63. If the ratio is smaller than [K Components] the pressure in the tire is too low, and Ptire will be increased by advancing lead nut 148 against the spring 54 to open the fill valve 75, until signals show the ratio is equal to [K Components], at which time the motor 142 will be driven to close the fill valve 75.

As shown in FIG. 8, the system can optionally include a control panel 164. This is shown in more detail in FIG. 10. The control panel 164 can be mounted in the cab of the tractor and accessible to the driver to permit the tire inflation system operation to be in the automatic or the manual mode. The ECU 154 will operate in the automatic mode, as described above, unless the toggle switch 166 is activated.

A pressure display 168 driven by an output from ECU 154 is incorporated in control panel 164, notifying the driver of the pressure in the tires at all times. Switches 165, 166 control the direction and the amount of rotation of the motor 142 of the motor driven pressure regulator 12″ in the manual mode of operation. Conductors 170 and 172 are connected to the ECU 154 and to a double pole relay within the control panel 164. Conductor 170 connects to the common pole 176 of one of the relay sections. Conductor 172 connects to the common pole 178 of the other relay section.

Figure 10:
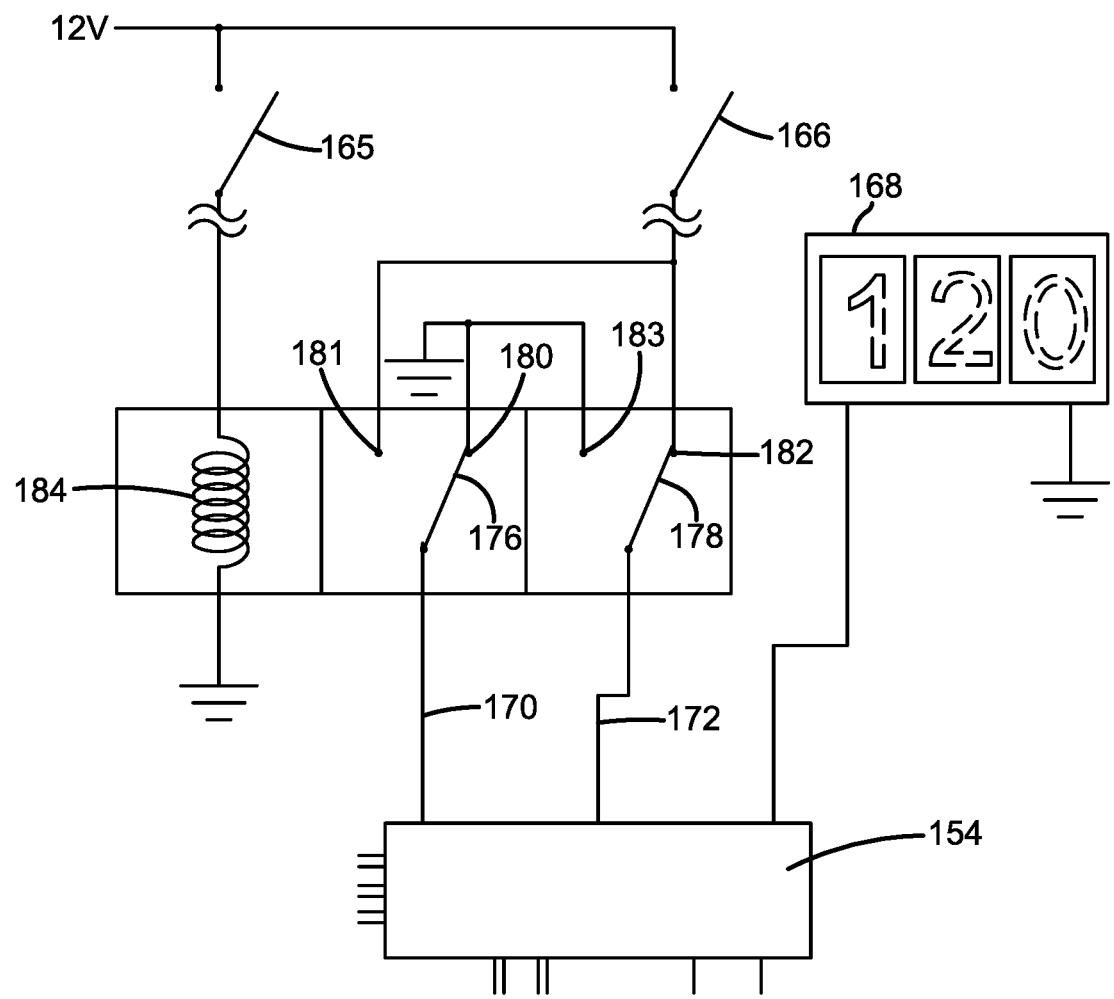
FIG. 10 is a schematic representation of a control panel.

When the normally open, two-position, toggle switch contact 165 controlling the motor rotation direction is as shown, the relay contacts are as shown (FIG. 10). In the case of stepper motor usage, contact 176 is connected to conductor 170 and to ground through pole 180 supplying a "0" voltage signal to the motor direction pin of the integrated circuit IC incorporated in the ECU to control the stepper motor in clockwise rotation of the motor. In the case of DC motor usage, contact 176 is connected to conductor 170 and to ground through pole 180 supplying a ground path to the DC motor to control the DC motor in clockwise rotation of the motor.

Now, if the driver presses the normally open, momentary, motor start switch contact 166, the voltage sent to ECU 154 through contact 182 and conductor 172 will cause the motor 142 of the motor driven pressure regulator 12″ to rotate in the clockwise direction to increase pressure to the outlet piston 40 and will continue to increase as long as switch contact 166 is held closed.

When the driver activates the two-position, toggle switch contact 165 to the closed position, the relay coil 184 will cause the contacts 176, 178 to shift to make contact with the opposite contacts 181, 183, respectively. In the case of stepper motor usage, contact 176 is connected to conductor 170 and to pole 181 and will supply the voltage signal from contact 166 to the motor direction pin of the IC incorporated in the ECU to control the stepper motor in counter clockwise rotation of the motor. In the case of DC motor usage, contact 176 is connected to conductor 170 and to pole 181 and will supply the voltage signal from contact 166 to the dc motor to control the dc motor in counter clockwise rotation of the motor.

Now, if the driver closes the momentary, motor start switch contact 166, the voltage sent to ECU 154 through contact 181 and conductor 170 will cause the motor 142 of the motor driven pressure regulator 12″ to rotate in the opposite direction to decrease pressure to the outlet piston 40 and will continue to decrease as long as switch contact 166 is held closed.

Figure 8A:
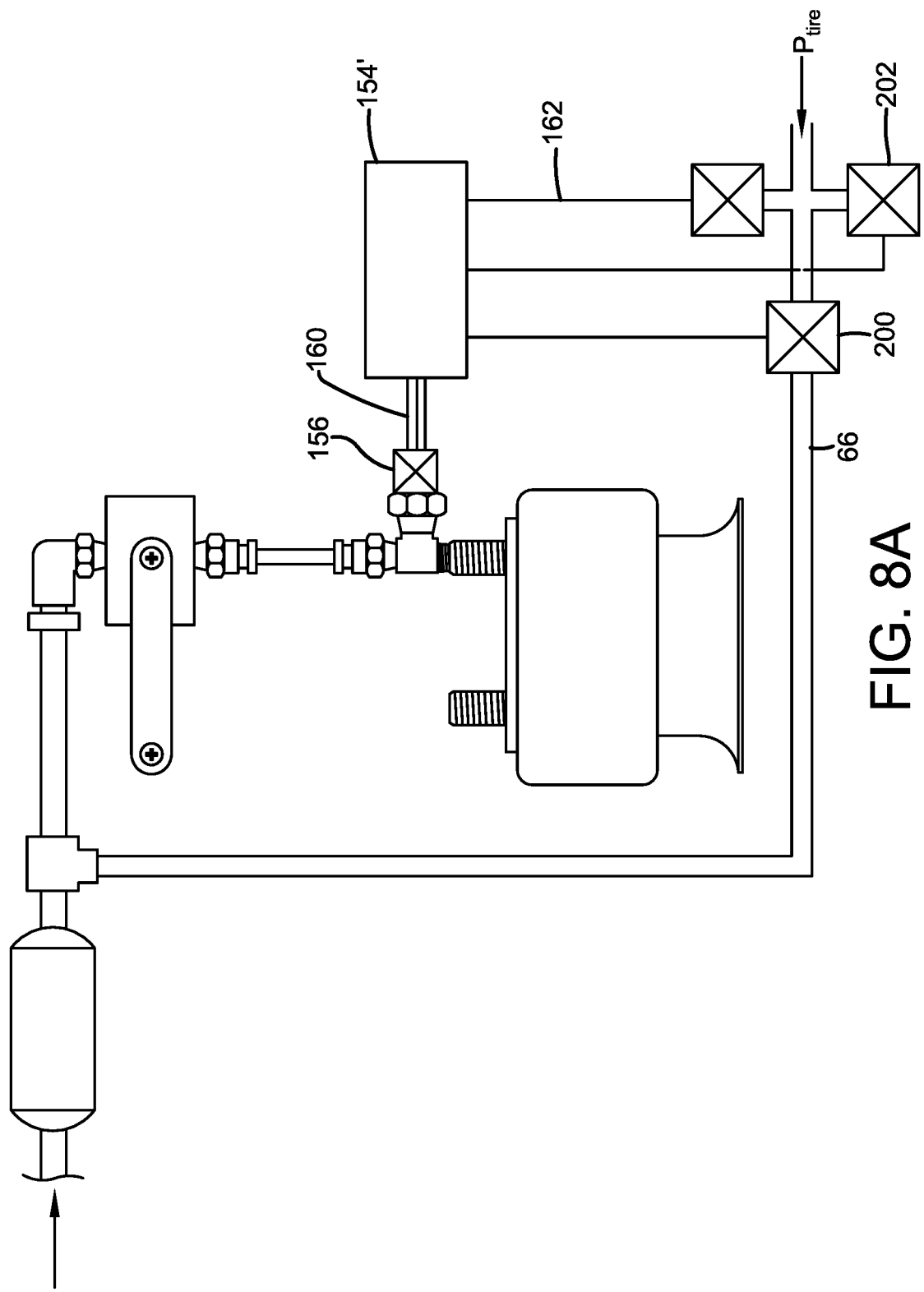
FIG. 8A is a schematic representation of another embodiment of a load based tire pressure regulation system in accordance with this invention.

In FIG. 8A, a simplified version of the third embodiment is shown. Here, the pressure of the air spring PAS is relayed to a control unit 154' from pressure transducer 156 as at signal 160, and the pressure of the tire(s) Ptire is relayed to the control unit 154' from pressure transducer 158 as at signal 162. The control unit 154' compares those signals as described above with the application of Equation 6, and the control unit 154 opens a fill valve 200 to feed air to the tire(s) or opens an exhaust valve 202 to bleed air from the tire(s), the communication of the control unit with the valves 200, 202 being represented by simple lines.

Figure 11:
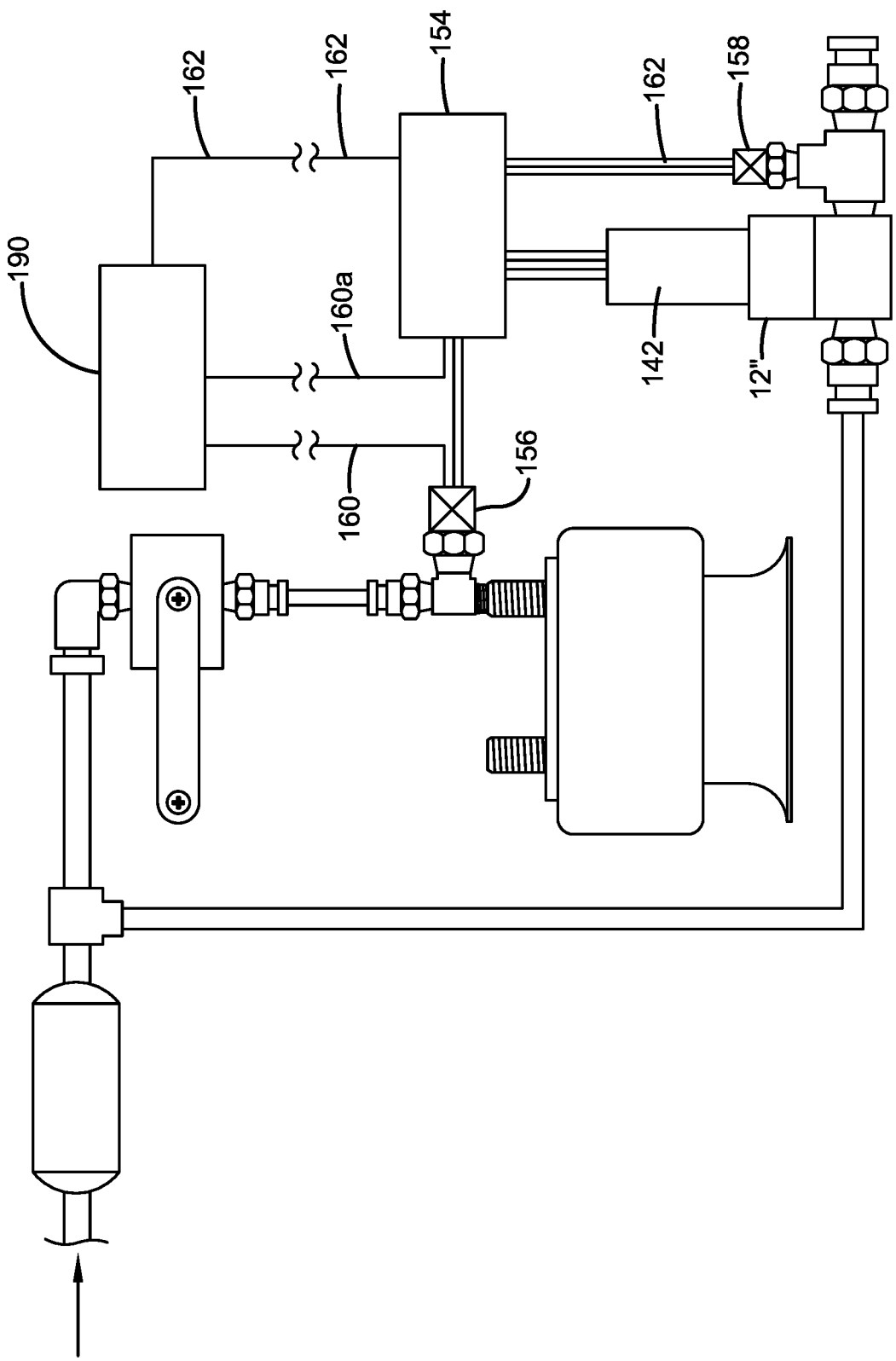
FIG. 11 is a schematic representation of another embodiment of a load based tire pressure regulation system in accordance with this invention.
Figure 12:
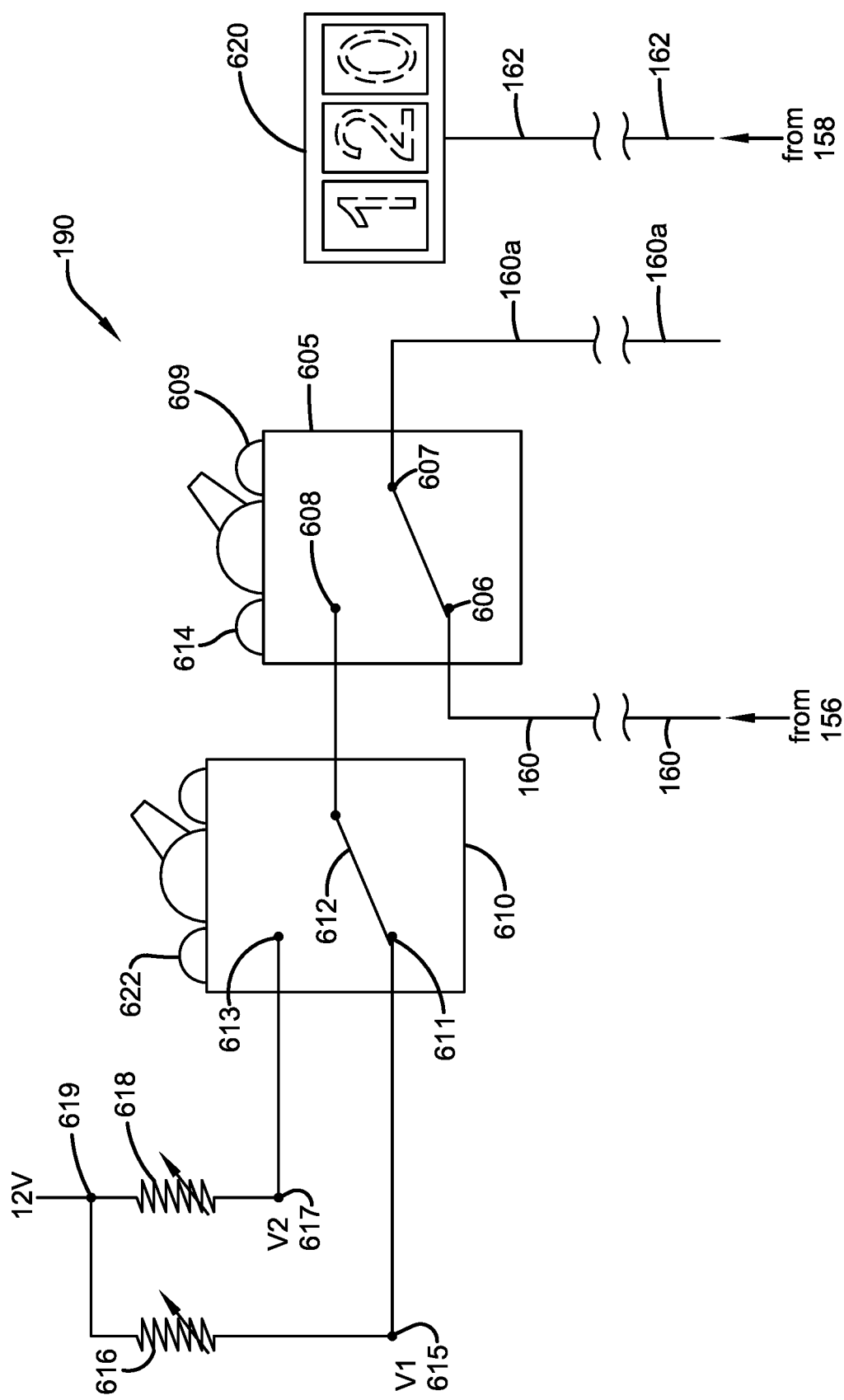
FIG. 12 is a schematic representation of a control panel.

FIGS. 11 and 12 show a further embodiment of the load based tire inflation invention of FIG. 8, wherein, the signal 160 from pressure transducer 156 is routed to a control panel 190 intended to be mounted in the cab of the tractor close to the driver. The signal 162 from the pressure transducer 158 is also sent to the control panel 190 as at pressure display 620. The control panel 190 is similar to, but wired differently from, control panel 112 (FIG. 7A). Electrical switches 605, 610 permit the selection of operation of the tire inflation system in automatic, emergency, or driver selected modes.

As in FIG. 12, the signal voltage conductor 160 of pressure transducer 156 is connected to normally closed terminal 606 and to common terminal 607 of toggle switch 605. Conductor 160a connects common terminal 607 of toggle switch 605 to ECU 154. The normally open terminal 608 of toggle switch 605 connects to the common terminal 612 of toggle switch 610 and to normally closed terminal 611 of toggle switch 610. Normally closed terminal 611 of toggle switch 610 connects to emergency voltage V1, controlled by the voltage drop of supply voltage 619 through potentiometer 616, at junction 615. Normally open terminal 613 of toggle switch 610 connects to driver adjusted voltage V2, controlled by the voltage drop of supply voltage 619 through potentiometer 618, at junction 617.

In the de-energized condition shown, signal voltage in the conductor 160 is conducted, unimpeded, through toggle switch 605, conductor 160a, and ECU 154. When toggle switch 605 is energized, signal voltage conductor 160 of pressure transducer 156 is disconnected from ECU 154 and normally open terminal 608 of toggle switch 605 is connected to the common terminal 612 of toggle switch 610. Emergency voltage V1 is, now connected to conductor 160a, and ECU 154. If toggle switch 610 is, now, energized, also, emergency voltage V1 is disconnected from ECU 154 and driver adjusted voltage V2 is connected to ECU 154. Lights such as at 609, 614, 622 can be used to signal the driver as to the particular mode currently active.

In all of the embodiments described above that utilize electrical conductors to send operational signals, weight and cost will be negatively impacted. There exist a number of alternative means to accomplish the transmission of these signals.

Figure 13:
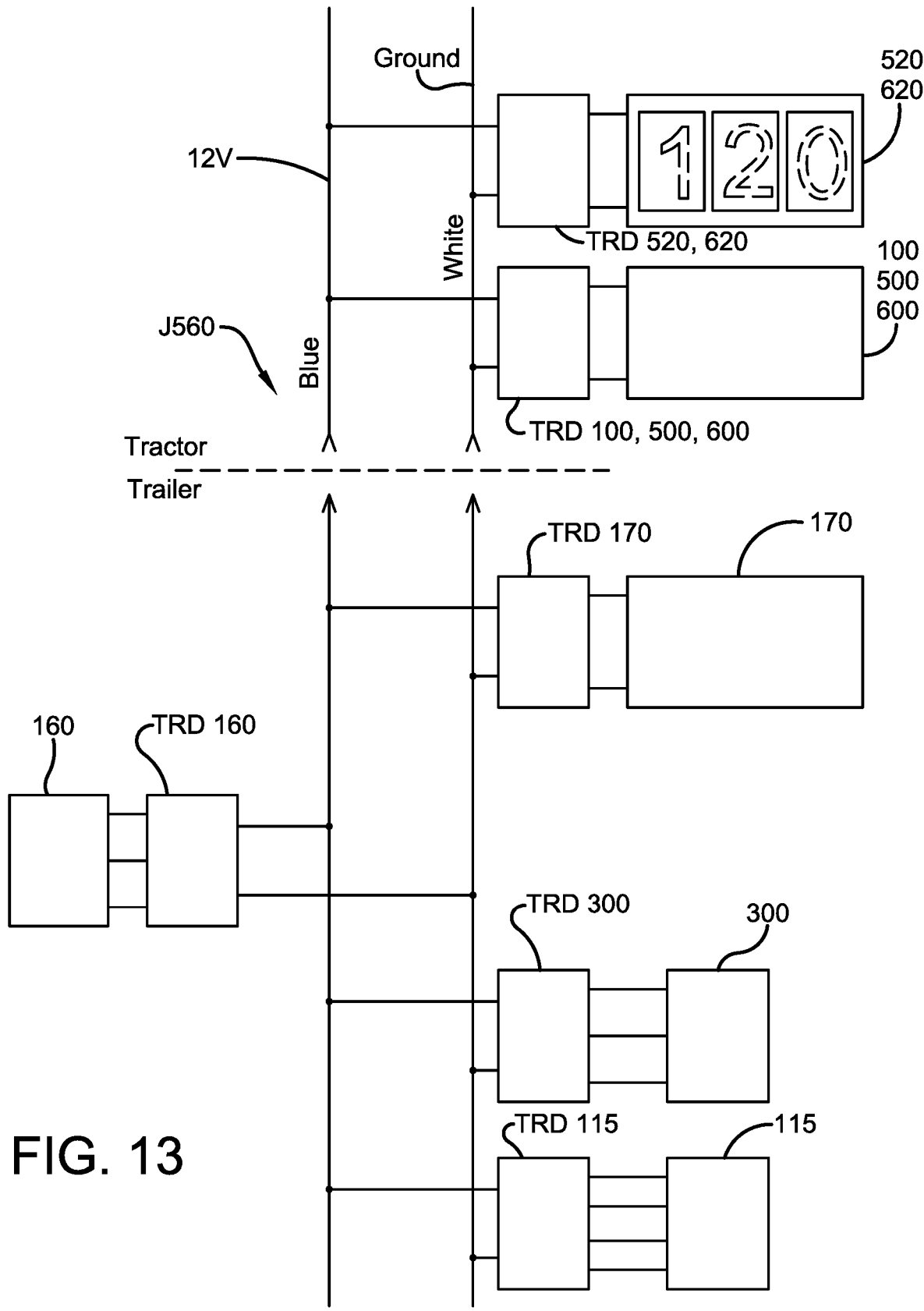
FIG. 13 is a schematic representation of utilization of PLC4Trucks and a SAE J2497 communication protocol utilizing existing tractor-to-trailer 7-way connector J560.

The first is by utilizing PLC4Trucks, a SAE J2497 communication protocol utilizing the existing tractor-to-trailer 7-way connector J560, as generally exemplified in FIG. 13. Each code numbered device has a designated identification, like TRD 170 (transmit/receive device 170 messages) for the ECU 154 on the network, and is supplied 12V power and ground by the blue wire and the white wire, respectively, FIG. 13. A signal may be transmitted TX or received RX from any code numbered device on the blue wire. Only the code numbered devices that need the information transmitted by a code numbered device TRD xxx receive it.

A second means of transmitting the device signals is by utilizing Bluetooth communication. As described above, the devices would be supplied 12V power and ground by the blue wire and the white wire, respectively. The signal from the device would be broadcast, wirelessly, to any nearby device within the range of the sent signal.

A third means of transmitting the device signals is by utilizing WIFI communication. Also, as described above, the devices would be supplied 12V Power and ground by the blue wire and the white wire, respectively. The signal from the device would be broadcast, wirelessly, to any nearby device within the range of the sent signal.

In light of the foregoing, it should be appreciated that the present invention significantly advances the art by providing a load based tire pressure regulation system that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A load based tire pressure regulation system for trucks or trailers employing an air spring maintained at a variable pressure $P_{AS}$ depending upon the load on the truck or trailer, comprising:

a pressure regulator assembly adapted to receive air at pressure $P_{AS}$ and air at the pressure of at least one tire of a truck or trailer, and configured to feed air to and bleed air from the at least one tire of the truck or trailer as a function of the load on the truck or trailer, wherein the pressure regulator assembly is configured to feed air to and bleed air from the at least one tire of the truck or trailer based upon the pressure of the air spring $P_{AS}$ as a function of the load on the air spring $F_{AS}$, and further upon the recommended pressure $P_T$ of the at least one tire as a function of the load on the tire $F_T$, and wherein the at least one tire is on an axle of a suspension having a suspension beam pivot, wherein the air spring is secured to the suspension, and the pressure regulator assembly is configured to feed air to and bleed air from the at least one tire of the truck or trailer so as to achieve the recommended pressure $P_T$ according to the equation:

$$P_T = 2K_{AS}L2P_{AS} + K_T L1,$$

wherein $K_{AS}$ is the slope of a best fit line of $F_{AS}$ as a function of $P_{AS}$ for the truck or trailer, wherein $F_{AS}$ is the load on the air spring, $K_T$ is the slope of a best fit line of $F_T$ as a function of recommended tire pressure $P_T$, wherein $F_T$ is the load on the tire, L1 is the horizontal distance between the suspension beam pivot and the centerline of the axle, and L2 is the horizontal distance between the suspension beam pivot and the centerline of the air spring.

2. The load based tire pressure regulation system of claim 1, further comprising a control panel activatable to override the feeding of air to the pressure regulator assembly at pressure $P_{AS}$.

3. The load based tire pressure regulation system of claim 2, wherein the control panel is activatable to provide air to the pressure regulator assembly at $P_E$, wherein $P_E$ is chosen to inflate the at least one tire of the truck or trailer to the lowest recommended tire inflation pressure from the tire manufacturer.

4. The load based tire pressure regulation system of claim 3, wherein the control panel is further activatable to provide air to the pressure regulator assembly at Preg, wherein Preg is chosen to inflate the at least one tire of the truck or trailer to the lowest recommended tire inflation pressure from the tire manufacturer.

5. The load based tire pressure regulation system of claim 4, further comprising an emergency solenoid valve controlled by the control panel to override the feeding of air to the pressure regulator assembly at pressure $P_{AS}$.

6. The load based tire pressure regulation system of claim 5, further comprising an emergency relieving pressure regulator configured to provide air at pressure $P_E$ to the emergency solenoid valve.

7. The load based tire pressure regulation system of claim 6, further comprising a driver-controlled solenoid valve controlled by the control panel to override the feeding of air to the pressure regulator assembly at pressure $P_{AS}$.

8. The load based tire pressure regulation system of claim 7, further comprising a driver-controlled relieving pressure regulator configured to provide air at pressure $P_E$ to the driver-controlled solenoid valve.

9. The load based tire pressure regulation system of claim 2, wherein the control panel is activatable to provide air to the pressure regulator assembly at Preg, wherein Preg is chosen to inflate the at least one tire of the truck or trailer to the lowest recommended tire inflation pressure from the tire manufacturer.

10. A load based tire pressure regulation system for trucks or trailers employing an air spring maintained at a variable pressure $P_{AS}$ depending upon the load on the truck or trailer, comprising:

a pressure regulator assembly adapted to receive air at pressure $P_{AS}$ and air at the pressure of at least one tire of a truck or trailer, and configured to feed air to and bleed air from the at least one tire of the truck or trailer as a function of the load on the truck or trailer, wherein the pressure regulator assembly is configured to feed air to and bleed air from the at least one tire of the truck or trailer based upon the pressure of the air spring $P_{AS}$ as a function of the load on the air spring ($F_A$s), and further upon the recommended pressure $P_T$ of the at least one tire as a function of the load on the tire ($F_T$), wherein the pressure regulator assembly includes:

a control unit, a pressure transducer configured to receive air at pressure $P_{AS}$ and feed a signal expressing pressure $P_{AS}$ to said control unit, and a pressure transducer receiving air from the at least one tire at pressure Ptire and feeding a signal expressing pressure Ptire to said control unit, said control unit controlling a fill valve for feeding air to said at least one tire, and said control unit controlling an exhaust valve for bleeding air from said at least one tire according to said signals, wherein the at least one tire is on an axle of a suspension having a suspension beam pivot, wherein the air spring is secured to the suspension, wherein the control unit is configured to adjust the pressure Ptire in the at least one tire so that $P\text{tire} = 2K_{AS}L2P_{AS} \div K_T L1$ wherein $K_{AS}$ is a best fit linear slope of $F_{AS}$ as a function of $P_{AS}$ for the truck or trailer, wherein $F_{AS}$ is the load on the air spring, $K_T$ is a best fit linear slope of $F_T$ as a function of $P_T$, wherein $F_T$ is the load on the tire, L1 is the horizontal distance between the suspension beam pivot and the centerline of the axle, and L2 is the horizontal distance between the suspension beam pivot and the centerline of the air spring.

11. The load based tire pressure regulation system of claim 10, further comprising a control panel activatable to operate the tire inflation in a manual mode.

12. The load based tire pressure regulation system of claim 10, further comprising a control panel activatable to override the feeding of the signal expressing pressure $P_{AS}$ to said control unit.

13. The load based tire pressure regulation system of claim 12, wherein the control panel is activatable to provide an emergency signal to said control unit to achieve a desired emergency tire pressure.

14. The load based tire pressure regulation system of claim 13, wherein the control panel is activatable to provide a driver adjusted signal to said control unit to achieve a desired driver adjusted tire pressure.

* * * * *